(12) United States Patent
Naruo et al.

(10) Patent No.: US 9,320,106 B2
(45) Date of Patent: Apr. 19, 2016

(54) LIGHTING DEVICE AND LUMINAIRE USING THE SAME

(71) Applicant: Panasonic Corporation, Osaka (JP)

(72) Inventors: Masahiro Naruo, Osaka (JP); Kenichi Fukuda, Osaka (JP); Sana Yagi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/498,101

(22) Filed: Sep. 26, 2014

(65) Prior Publication Data

US 2015/0091468 A1    Apr. 2, 2015

(30) Foreign Application Priority Data

Oct. 1, 2013    (JP) .................................. 2013-206582

(51) Int. Cl.
    *H05B 33/08*    (2006.01)
(52) U.S. Cl.
    CPC ........ *H05B 33/0887* (2013.01); *H05B 33/0815* (2013.01); *Y02B 20/346* (2013.01)
(58) Field of Classification Search
    None
    See application file for complete search history.

(56) References Cited

U.S. PATENT DOCUMENTS

| | | | | |
|---|---|---|---|---|
| 5,629,588 A * | 5/1997 | Oda | ................... | H05B 41/2921 315/119 |
| 5,828,177 A * | 10/1998 | Toda | ................... | H05B 41/2921 307/10.8 |
| 6,320,359 B1 * | 11/2001 | Nagaya et al. | ................ | 323/224 |
| 7,378,806 B2 * | 5/2008 | Nerone | ............. | H05B 41/2926 315/291 |
| 7,612,542 B2 * | 11/2009 | Eguchi | .................. | H02M 3/156 323/222 |
| 8,274,237 B2 * | 9/2012 | Nagase | ................ | H05B 33/089 315/185 S |
| 8,680,884 B2 * | 3/2014 | Chobot | .................. | G01R 31/40 323/271 |
| 8,692,477 B1 * | 4/2014 | Lee | .................... | H05B 33/0815 315/185 S |
| 8,742,692 B2 * | 6/2014 | Wang | ................. | H05B 33/0887 315/186 |
| 8,981,666 B2 * | 3/2015 | Yu | ........................ | G09G 3/3406 315/291 |
| 2006/0197470 A1 * | 9/2006 | Ribarich et al. | .............. | 315/291 |
| 2010/0156324 A1 | 6/2010 | Nagase et al. | | |

FOREIGN PATENT DOCUMENTS

| | | |
|---|---|---|
| JP | 2010-118270 | 5/2010 |
| JP | 2010-129612 | 6/2010 |
| JP | 2011-077037 | 4/2011 |
| JP | 2012-014879 | 1/2012 |
| JP | 2012-155893 | 8/2012 |

* cited by examiner

*Primary Examiner* — Alexander H Taningco
*Assistant Examiner* — Nelson Correa
(74) *Attorney, Agent, or Firm* — Renner, Otto, Boisselle & Sklar, LLP

(57) ABSTRACT

A lighting device for lighting a solid light-emitting element includes: a DC power source circuit configured to output DC power; a power conversion circuit including a semiconductor element connected between output terminals of the DC power source circuit, the power conversion circuit configured to supply power to the solid light-emitting element through a control of a conduction state of the semiconductor element; a first control circuit configured to control an output of the DC power source circuit; a second control circuit configured to control an output of the power conversion circuit by controlling the conduction state of the semiconductor element; and a short-circuit detection circuit configured to detect a short-circuit in the semiconductor element. The first control circuit reduces the output of the DC power source circuit when the short-circuit detection circuit detects the short-circuit in the semiconductor element.

6 Claims, 18 Drawing Sheets

LIGHTING DEVICE AND LUMINAIRE USING THE SAME

CROSS-REFERENCE TO RELATED APPLICATION

This application claims the benefit of priority of Japanese Patent Application Number 2013-206582, filed on Oct. 1, 2013, the entire contents of which are hereby incorporated by reference.

TECHNICAL FIELD

The present disclosure relates to a lighting device that lights solid light-emitting elements, and a luminaire using the same.

BACKGROUND ART

Conventionally, there has been provided a lighting device to light solid light-emitting elements (semiconductor light-emitting elements) such as LED (light-emitting diode) elements or organic EL (electro-luminescence) elements (see, e.g., Japanese Unexamined Patent Application Publication No. 2012-014879). A lighting device disclosed in the above-mentioned reference includes a power-factor correction circuit and a power conversion circuit. The power-factor correction circuit is connected to an AC power source. The power conversion circuit performs power conversion on the output from the power-factor correction circuit to supply current to solid light-emitting elements, thereby lighting the solid light-emitting elements.

The lighting device disclosed in the above-mentioned reference further includes an abnormality detection circuit and a control circuit. The abnormality detection circuit detects abnormality (such as short-circuit and open-circuit) in the solid light-emitting elements. When abnormality in the solid light-emitting elements is detected by the abnormality detection circuit, the control circuit stops the operation of the power-factor correction circuit or suppresses the output of the power-factor correction circuit.

In order to regulate the current supplied to the solid light-emitting elements to be constant, the power conversion circuit of the above-mentioned reference is configured as a step-down chopper circuit having a switching element (a semiconductor element). Accordingly, when the switching element has a short-circuit failure, current is continuously supplied from the power-factor correction circuit to the solid light-emitting elements, and thus the solid light-emitting elements produce heat. The abnormality detection circuit in the above-mentioned reference is merely to detect abnormality in the solid light-emitting elements, but is not able to cope with a short-circuit failure of the switching element.

SUMMARY OF THE INVENTION

In view of the above, the present disclosure provides a lighting device that is capable of suppressing solid light-emitting elements from producing heat when a semiconductor element is short-circuited, and a luminaire using the same.

In accordance with an aspect of the present invention, there is provided a lighting device for lighting a solid light-emitting element, including: a DC power source circuit configured to output DC power; a power conversion circuit including a semiconductor element connected between output terminals of the DC power source circuit, the power conversion circuit configured to supply power to the solid light-emitting element through a control of a conduction state of the semiconductor element; a first control circuit configured to control an output of the DC power source circuit; a second control circuit configured to control an output of the power conversion circuit by controlling the conduction state of the semiconductor element; and a short-circuit detection circuit configured to detect a short-circuit in the semiconductor element, wherein the first control circuit reduces the output of the DC power source circuit when the short-circuit detection circuit detects the short-circuit in the semiconductor element.

In the lighting device, the semiconductor element may be a switching element, switching of the switching element being controlled by the second control circuit, and the power conversion circuit may be a chopper circuit that supplies a desired power to the solid light-emitting element through a control of current flowing in the switching element.

The lighting device may further include a voltage detection circuit configured to detect a voltage at a higher-potential terminal or at a lower-potential terminal of the semiconductor element, wherein the short-circuit detection circuit may compare a detection result by the voltage detection circuit with a threshold value, and determines whether or not the semiconductor element is in a short-circuit state based on a comparison result.

The lighting device may further include a current detection circuit configured to detect a current flowing in the switching element, wherein the short-circuit detection circuit may compare a detection result by the current detection circuit with a threshold value, and may determine whether or not the semiconductor element is in a short-circuit state based on a duration of a time period in which the detection result by the current detection circuit is equal to or greater than the threshold value.

The lighting device may further include: a current detection circuit configured to detect a current flowing in the switching element; and a timer configured to start to count when the second control circuit outputs an on-signal to turn on the switching element, and configured to reset a counted value when a detection result by the current detection circuit reaches a predetermined value, wherein the short-circuit detection circuit may determine that the switching element is in a short-circuit state if the counted value by the timer exceeds a threshold value.

The lighting device may further include: a current detection circuit; and a timer configured to measure time, wherein the chopper circuit may include an inductor, in which the solid light-emitting element, the inductor and the switching element are connected in series to one another between the output terminals of the DC power source circuit; wherein the current detection circuit may detect current flowing in the inductor; wherein the timer may start to count when the control circuit outputs an on-signal to turn on the switching element and may reset a counted value when a detection result by the current detection circuit becomes lower than a predetermined value; and wherein the short-circuit detection circuit may determine that the switching element is in a short-circuit state if the counted value by the timer exceeds a threshold value.

The lighting device may further include a voltage detection circuit configured to detect an output voltage of the DC power source circuit, wherein the chopper circuit may include an inductor, in which the solid light-emitting element, the inductor and the switching element are connected in series to one another between the output terminals of the DC power source circuit; and wherein the short-circuit detection circuit may determine that the switching element is in a short-circuit state if a detection result by the voltage detection circuit is less than a threshold value while the second control circuit outputs an off-signal to turn off the switching element.

In accordance with another aspect of the present invention, there is provided a luminaire including a lighting device and a solid light-emitting element to be powered by the lighting device, the lighting device including: a DC power source circuit configured to output DC power; a power conversion circuit including a semiconductor element connected between output terminals of the DC power source circuit, the power conversion circuit configured to supply power to the solid light-emitting element through a control of a conduction state of the semiconductor element; a first control circuit configured to control an output of the DC power source circuit; a second control circuit configured to control an output of the power conversion circuit by controlling the conduction state of the semiconductor element; and a short-circuit detection circuit configured to detect a short-circuit in the semiconductor element, wherein the first control circuit reduces the output of the DC power source circuit when the short-circuit detection circuit detects the short-circuit in the semiconductor element.

As set forth above, according to the aspects of the present invention, if the short-circuit detection circuit detects a short-circuit in a semiconductor element, the first control circuit reduces the output of the DC power source circuit to thereby reduce current supplied to solid light-emitting elements. Accordingly, when the semiconductor element has a short-circuit failure, it is possible to suppress the solid light-emitting elements from producing heat.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

Hereinafter, embodiments of the present invention will be described with reference to accompanying drawings which form a part hereof.

(Embodiment 1)

Figure 1:
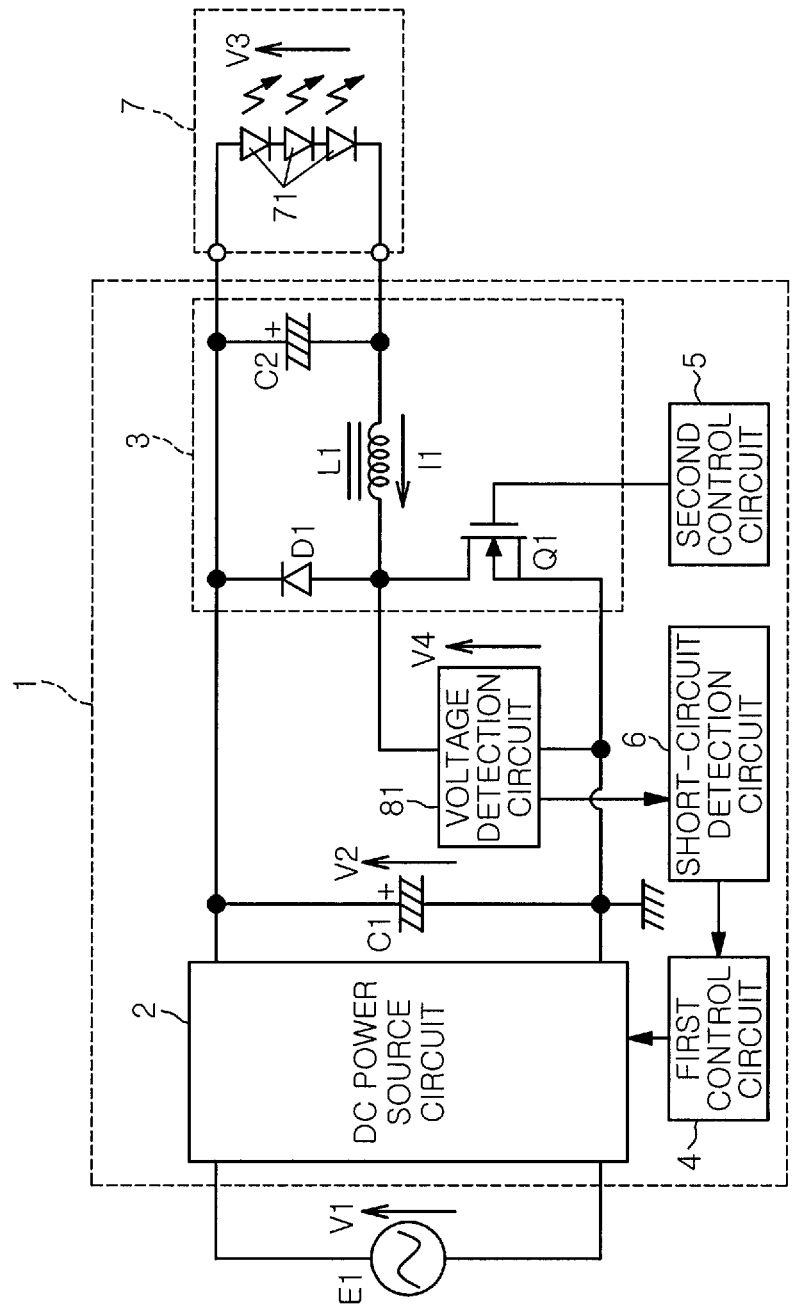
FIG. 1 is a circuit block diagram of a lighting device in accordance with an embodiment of the present invention.

FIG. 1 is a circuit block diagram of a lighting device in accordance with a first embodiment of the present invention. The lighting device 1 according to the first embodiment mainly includes a DC power source circuit 2, a power conversion circuit 3, a first control circuit 4, a second control circuit 5, and a short-circuit detection circuit 6. In addition, the lighting device 1 uses a commercial power supply E1 as an input power supply to light LED (light-emitting diode) elements 71 (solid light-emitting elements). Hereinafter, the configuration of the lighting device 1 will be described.

The DC power source circuit 2 is connected to the commercial power supply E1 and outputs DC power. Specifically, the DC power source circuit 2 is configured as an AC/DC conversion circuit that converts an AC voltage V1 (hereinafter referred to as a first voltage V1) supplied from the commercial power supply E1 into a DC voltage V2 (hereinafter referred to as a second voltage V2). Further, a capacitor C1 is connected between output terminals of the DC power source circuit 2. The capacitor C1 works as a smoothing capacitor. Further, the negative terminal of the capacitor C1 is connected to the ground potential of the circuit.

The first control circuit 4 controls the operation of the DC power source circuit 2 to control the output of the DC power source circuit 2. In this embodiment, the first control circuit 4 performs constant voltage control such that the second voltage V2 becomes a predetermined value.

The power conversion circuit 3 is connected to the outputs of the DC power source circuit 2. In addition, the power conversion circuit 3 converts the output power from the DC power source circuit 2 into a desired power level to supply it to the LED elements 71. Specifically, the power conversion circuit 3 is configured as a step-down chopper circuit that includes a switching element Q1 (a semiconductor element), an inductor L1, a diode D1, and a capacitor C2. A series circuit of the capacitor C2, the inductor L1 and the switching element Q1 connected in that order is connected between the output terminals of the DC power source circuit 2 (between two terminals of the capacitor C1). In addition, the diode D1 is connected in parallel to a series circuit of the capacitor C2 and the inductor L1. The capacitor C2 works as a smoothing capacitor. Further, the diode D1 works as a flyback diode. The switching element Q1 is configured as an n-channel MOSFET (metal-oxide-semiconductor-field-effect-transistor). Further, the switching of the switching element Q1 is controlled by the second control circuit 5.

Further, a light source 7 is connected between the output terminals of the power conversion circuit 3 (between two terminals of the capacitor C2). The light source 7 has a series circuit of one or more LED elements 71 (three LED elements are shown in FIG. 1). The series circuit of the LED elements 71 is connected in parallel to the capacitor C2.

Further, by controlling the switching of the switching element Q1, the power conversion circuit 3 generates a stepped-down DC voltage from the second voltage V2. The stepped-down DC voltage is applied to the light source 7. Upon the DC voltage being applied to the light source 7, DC current flows in every LED element 71, so that every LED element 71 is lit. In this regard, the sum of voltage drops across the respective LED elements 71 is referred to as a third voltage V3.

The second control circuit 5 outputs a drive signal S1 to the switching element Q1 to control the switching of the switching element Q1. The drive signal S1 is a square wave having a high level (hereinafter referred to as H-level) and a low level (hereinafter referred to as L-level) repeated alternately. H-level of the drive signal S1 corresponds to an on-signal to turn on the switching element Q1. L-level of the drive signal S1 corresponds to an off-signal to turn off the switching element Q1. The second control circuit 5 outputs the drive signal S1 to the switching element Q1 to thereby turn on and off the switching element Q1. The second control circuit 5 controls the conduction state of the switching element Q1, namely, controls the current flowing in the switching element Q1 by way of turning on and off the switching element Q1. By the control of the current flowing in the switching element Q1, the power conversion circuit 3 supplies a desired power, specifically a desired constant current, to the LED elements 71. In this embodiment, the frequency and the off-duty (or on-duty) of the drive signal S1, for example, are fixed to preset values. However, the values of the frequency and the off-duty (or on-duty) of the drive signal S1 may vary.

The lighting device 1 according to the first embodiment further includes a voltage detection circuit 81 (a first voltage detection circuit) that detects a voltage V4 at the higher-potential terminal of the switching element Q1, i.e., the voltage V4 between the drain and source terminals of the switching element Q1 (hereinafter referred to as the fourth voltage V4). The voltage detection circuit 81 outputs a detection result to the short-circuit detection circuit 6.

The short-circuit detection circuit 6 detects a short-circuit in the switching element Q1. Specifically, the short-circuit detection circuit 6 compares a detection result from the voltage detection circuit 81 (the fourth voltage V4) with a threshold value $V_{th1}$ (a first threshold value). Then, the short-circuit detection circuit 6 determines whether or not the switching element Q1 is in a short-circuit state based on the comparison result.

Figure 2:
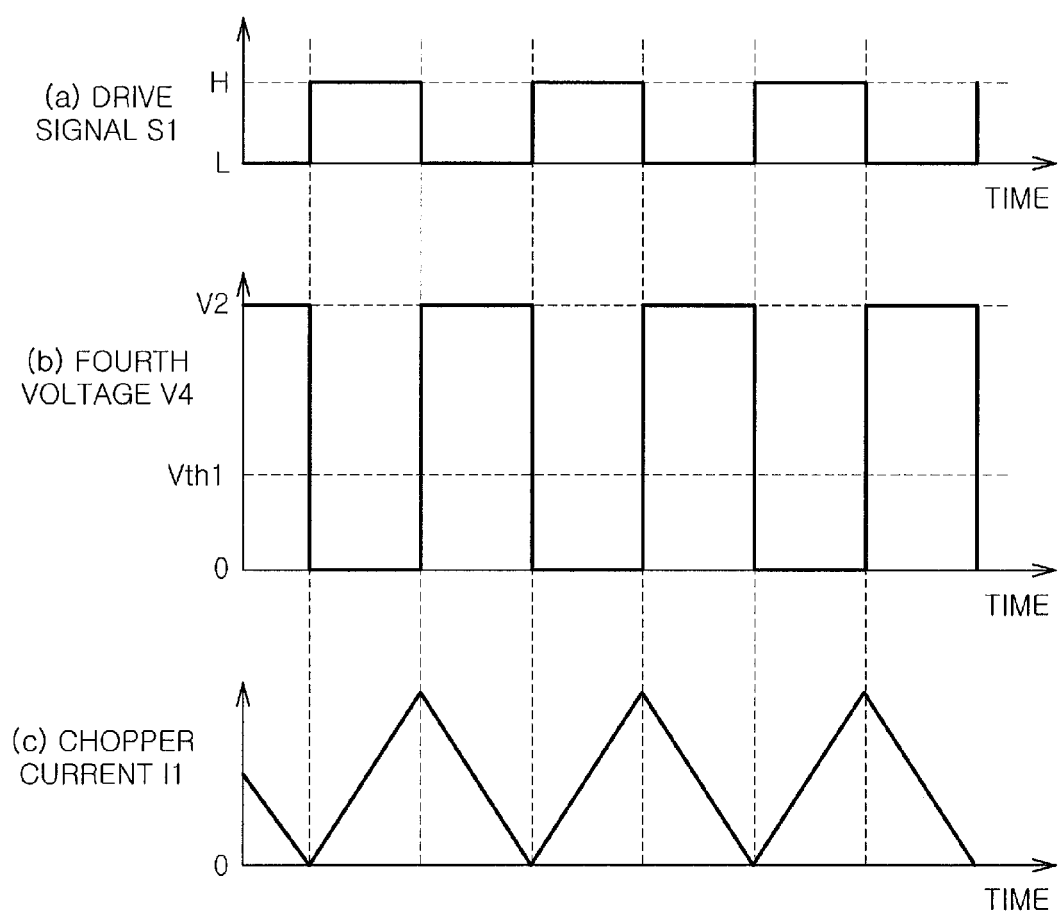
FIG. 2 shows waveform diagrams when a switching element Q1 included in the lighting device in accordance with the embodiment is normal, wherein (a) is a waveform diagram of a drive signal S1, (b) is a waveform diagram of a fourth voltage V4, and (c) is a waveform diagram of a chopper current I1.
Figure 3:
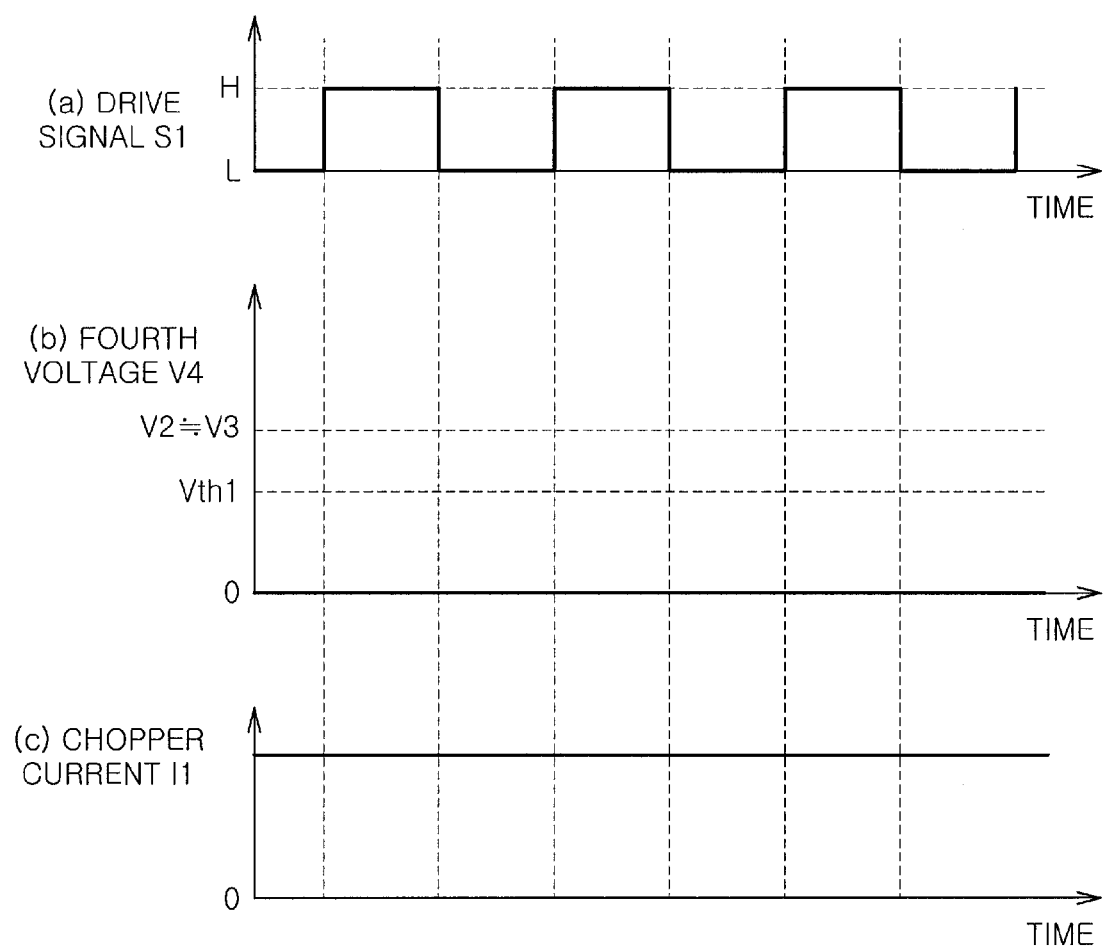
FIG. 3 shows waveform diagrams when the switching element included in the lighting device in accordance with the embodiment has a short-circuit failure, wherein (a) is a waveform diagram of the drive signal S1, (b) is a waveform diagram of the fourth voltage V4, and (c) is a waveform diagram of the chopper current I1.

In the following descriptions, it will be described how the short-circuit detection circuit 6 detects a short-circuit in the switching element Q1, with reference to waveform diagrams illustrated in FIGS. 2 and 3. FIG. 2 shows waveform diagrams when the switching element Q1 is normal, i.e., when the switching element Q1 has no short-circuit failure. FIG. 3 shows waveform diagrams when the switching element Q1 has a short-circuit failure. (a) in FIGS. 2 and 3 is a waveform diagram of the drive signal S1 that is outputted from the second control circuit 5 to the switching element Q1. (b) in FIGS. 2 and 3 is a waveform diagram of the fourth voltage V4 that is detected by the voltage detection circuit 81. (c) in FIGS. 2 and 3 is a waveform diagram of a chopper current I1 flowing in the inductor L1.

First, the operation when the switching element Q1 is in a normal state (when no short-circuit is formed) will be described.

When the drive signal S1 is at H-level, the switching element Q1 is turned on. As the switching element Q1 is turned on, the value of the fourth voltage V4 becomes zero (see (b) in FIG. 2). Additionally, as the switching element Q1 is turned on, the chopper current I1 increases linearly (see (c) in FIG. 2).

When the drive signal S1 is switched from H-level to L-level, the switching element Q1 is turned off. As the switching element Q1 is turned off, the value of the fourth voltage V4 becomes a value equal to the second voltage V2 that is outputted from the DC power source circuit 2 (see (b) in FIG. 2). Additionally, as the switching element Q1 is turned off, the chopper current I1 decreases linearly (see (c) in FIG. 2).

Next, the operation when the switching element Q1 has a short-circuit failure will be described.

If the switching element Q1 has a short-circuit failure, the switching element Q1 stays in the on-state all the time, irrespective of the signal level of the drive signal S1. Accordingly, the value of the fourth voltage V4 stays at zero all the time (see (b) in FIG. 3). In addition, if the switching element Q1 has a short-circuit failure, the DC current that is determined by the power supply capability of the DC power source circuit 2 continues to flow in the LED elements 71 and the inductor L1 (see (c) in FIG. 3). Further, the value of the second voltage V2 that is outputted from the DC power source circuit 2 decreases until it becomes approximately the same value as the DC voltage V3 (the sum of the voltage drops across the respective LED elements 71) (see (b) in FIG. 3).

As described above, when the switching element Q1 is in the normal state, the value of the fourth voltage V4 alternates between the value of the second voltage V2 and zero (see (b) in FIG. 2). On the other hand, when the switching element Q1 has a short-circuit failure, the value of the fourth voltage V4 stays at zero all the time (see (b) in FIG. 3).

In this regard, the short-circuit detection circuit 6 in this embodiment calculates the average value of the fourth voltage V4. Further, the short-circuit detection circuit 6 compares the average value of the fourth voltage V4 with the threshold value $V_{th1}$ to determine whether or not the switching element Q1 is in a short-circuit state. The average value of the fourth voltage V4 is obtained by multiplying the value of the second voltage V2 by the off-duty of the drive signal S1. If the average value of the fourth voltage V4 is equal to or greater than the threshold value $V_{th1}$, the short-circuit detection circuit 6 determines that the switching element Q1 is in the normal state (no short-circuit. On the other hand, if the average value of the fourth voltage V4 is less than the threshold value $V_{th1}$, the short-circuit detection circuit 6 determines that the switching element Q1 is in a short-circuit state, namely, detects a short-circuit in the switching element Q1. Further, if the short-circuit detection circuit 6 detects a short-circuit in the switching element Q1, the first control circuit 4 that controls the output of the DC power source circuit 2 reduces the output of the DC power source circuit 2.

As described above, the lighting device 1 according to the first embodiment includes the DC power source circuit 2, the power conversion circuit 3, the first control circuit 4, the second control circuit 5, and the short-circuit detection circuit 6. The DC power source circuit 2 outputs DC power. The power conversion circuit 3 has the switching element Q1 (the semiconductor element) connected between the output terminals of the DC power source circuit 2, and supplies power to the LED elements 71 (solid light-emitting elements) as the conduction state of the switching element Q1 is controlled. The first control circuit 4 controls the output of the DC power source circuit 2. The second control circuit 5 controls the conduction state of the switching element Q1 to thereby control the output of the power conversion circuit 3. The short-circuit detection circuit 6 detects a short-circuit in the switching element Q1. Further, if the short-circuit detection circuit 6 detects a short-circuit in the switching element Q1, the first control circuit 4 reduces the output of the DC power source circuit 2.

As the output of the DC power source circuit 2 is reduced, the current flowing in the LED elements 71 decreases. Accordingly, when the switching element Q1 has a short-circuit failure, the lighting device 1 of the first embodiment can suppress the LED elements 71 from producing heat and thus can improve safety.

In the case where the short-circuit detector circuit 6 detects a short-circuit in the switching element Q1, the first control circuit 4 may be configured to control the value of the second voltage V2 to be equal to or less than the sum of the forward voltages of the respective LED elements 71. As the value of the second voltage V2 is controlled to be equal to or less than the sum of the forward voltages of the respective LED elements 71, the LED elements 71 become a light-out state where currents rarely flows therein. Accordingly, it is possible to further suppress the LED elements 71 from producing heat, and therefore, safety can be further improved. Moreover, the DC power source circuit 2 keeps supplying power. Therefore, other circuits (the first control circuit 4, the second control circuit 5, the short-circuit detection circuit 6 and the like) can be driven using the output power from the DC power source circuit 2. As a result, no additional power source circuit is required.

Alternatively, in the case where the short-circuit detection circuit 6 detects a short-circuit in the switching element Q1, the first control circuit 4 may be configured to stop the driving of the DC power source circuit 2 in order to make the output of the DC power source circuit 2 zero. With this configuration, no power is supplied to the power conversion circuit 3 and the LED elements 71, so that safety can be enhanced.

If the on-duty of the drive signal S1 is set to be a relatively large value, the average value of the fourth voltage V4 becomes small even if the switching element Q1 is normal. Therefore, the average value of the fourth voltage V4 becomes a value close to the threshold value $V_{th1}$, so that there is a concern that the short-circuit detection circuit 6 erroneously determines that the switching element Q1 is in a short-circuit state.

For this reason, in the case where the on-duty of the drive signal S1 is set to be a relatively large value, it may be desirable that the second control circuit 5 outputs an off-signal before the short-circuit detection circuit 6 determines that the switching element Q1 is in a short-circuit state. Specifically, if the average value of the fourth voltage V4 becomes less than the threshold value $V_{th1}$, the second control circuit 5 sets the signal level of the drive signal S1 to L-level before the short-circuit detection circuit 6 detects a short-circuit in the switching element Q1. If the switching element Q1 is normal, the switching element Q1 is turned off, so that the value of the fourth voltage V4 increases. Therefore, the short-circuit detection circuit 6 dose not erroneously determine that the switching element Q1 is in a short-circuit state. On the other hand, if the switching element Q1 has a short-circuit failure, the value of the fourth voltage V4 does not increase. Therefore, the short-circuit detection circuit 6 determines that the switching element Q1 is in a short-circuit state.

Figure 4:
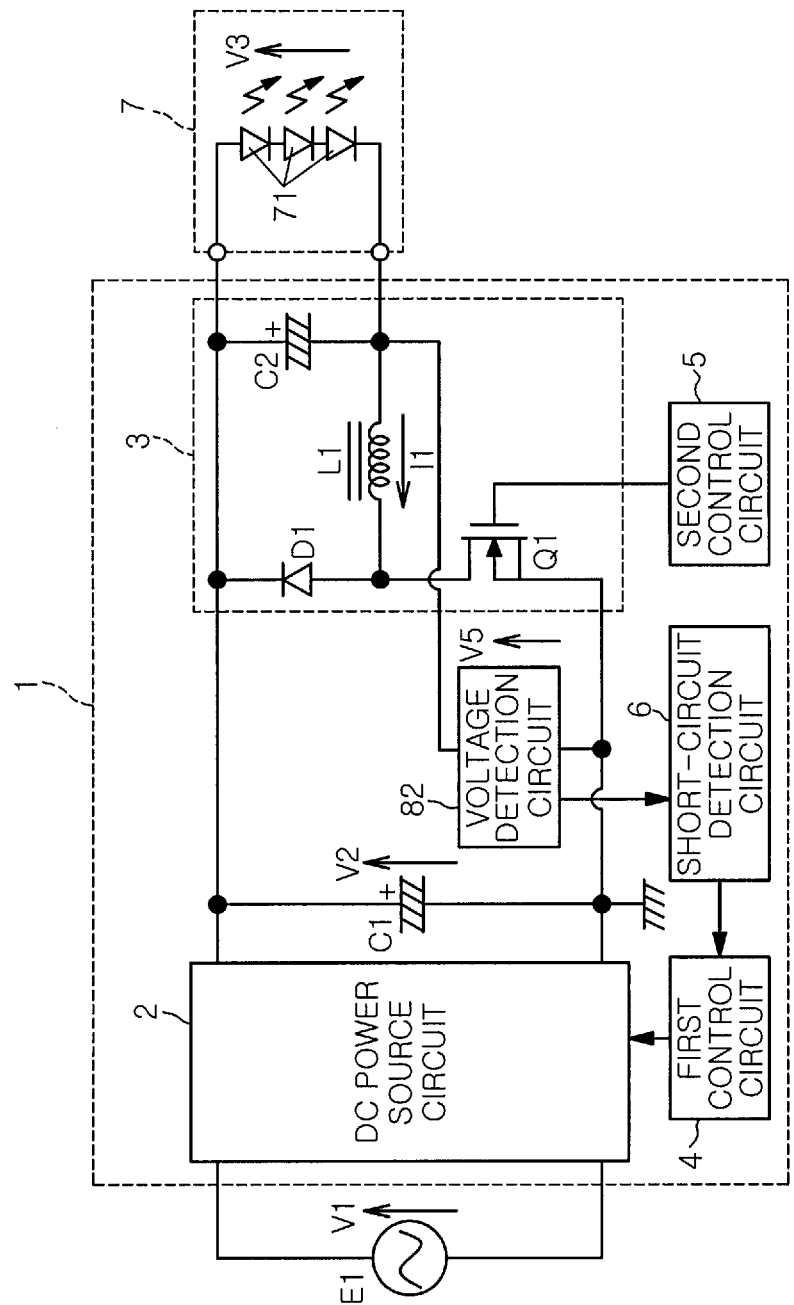
FIG. 4 is a circuit block diagram of a lighting device in accordance with a modification of the embodiment.

Next, a first modification of the lighting device 1 of the first embodiment will be described. FIG. 4 is a circuit block diagram of a lighting device 1 according to the first modification. The lighting device 1 according to the first modification includes a voltage detection circuit 82 in place of the above-described voltage detection circuit 81. The voltage detection circuit 82 detects a voltage V5 at the junction of the inductor L1, the capacitor C2 and the light source 7 (hereinafter referred to as a fifth voltage V5). In addition, the voltage detection circuit 82 outputs a detection result to the short-circuit detection circuit 6.

The short-circuit detection circuit 6 compares the detection result (the fifth voltage V5) from the voltage detection circuit 82 with a threshold value $V_{th2}$. Then, the short-circuit detection circuit 6 determines whether or not the switching element Q1 is in a short-circuit state based on the comparison result.

Figure 5:
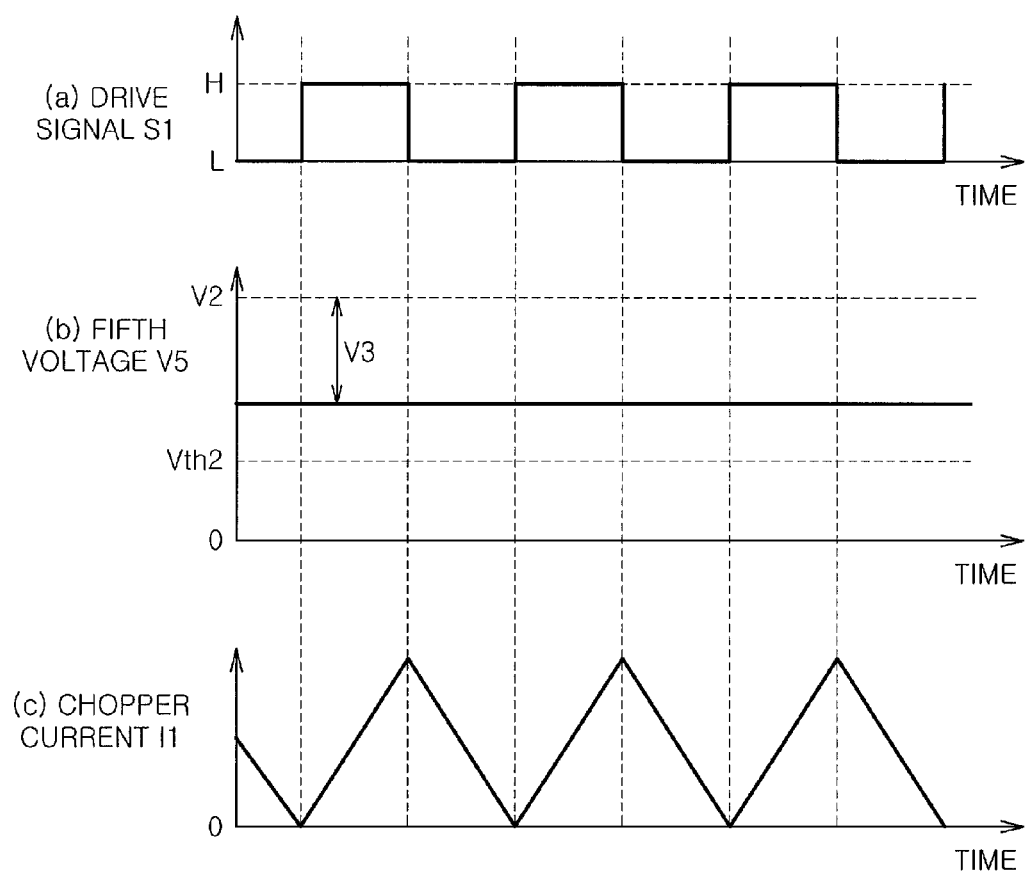
FIG. 5 shows waveform diagrams when a switching element included in the lighting device in accordance with the modification of the embodiment is normal, wherein (a) is a waveform diagram of a drive signal S1, (b) is a waveform diagram of a fifth voltage V5, and (c) is a waveform diagram of a chopper current I1.
Figure 6:
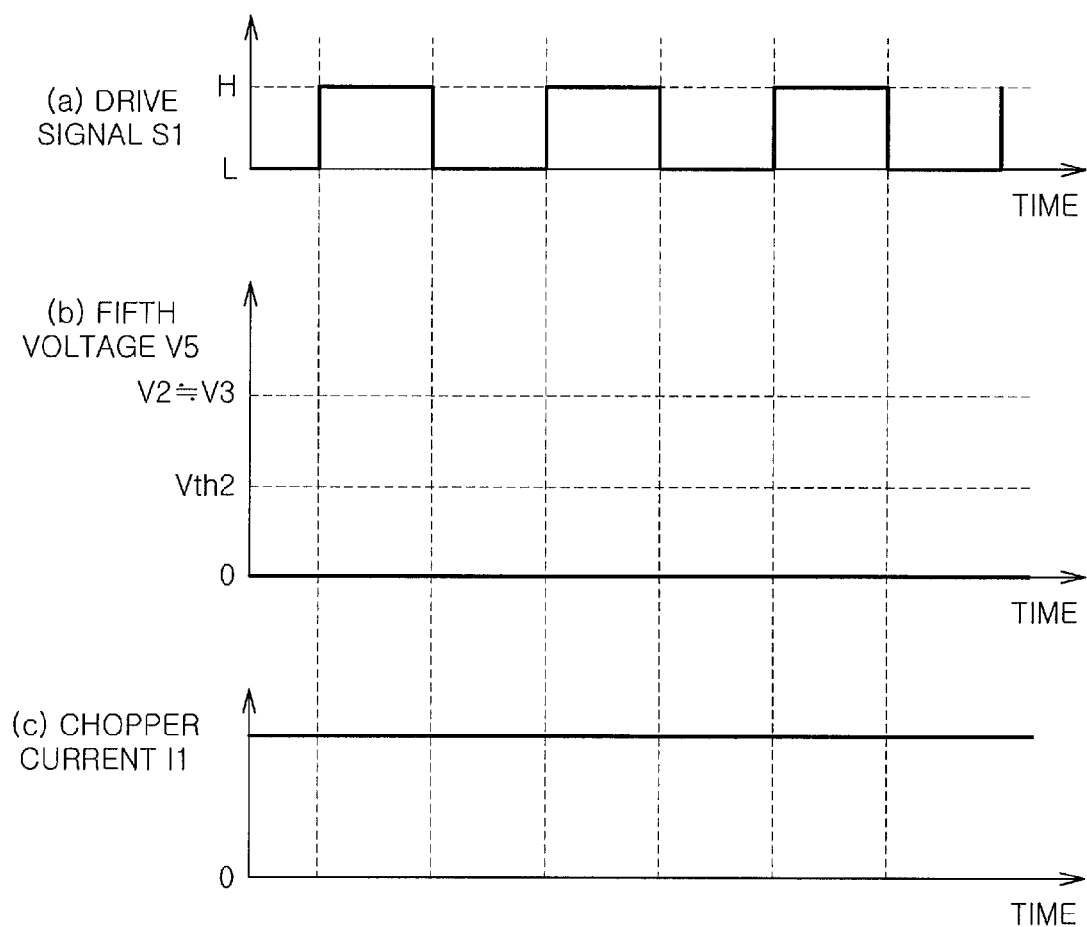
FIG. 6 shows waveform diagrams when the switching element included in the lighting device in accordance with the modification of the embodiment has a short-circuit failure, wherein (a) is a waveform diagram of the drive signal S1, (b) is a waveform diagram of the fifth voltage V5, and (c) is a waveform diagram of the chopper current I1.

In the following descriptions, it will be described how the short-circuit detection circuit 6 detects a short-circuit in the switching element Q1, with reference to waveform diagrams illustrated in FIGS. 5 and 6. FIG. 5 shows waveform diagrams when the switching element Q1 is normal, i.e., when the switching element Q1 has no short-circuit failure. FIG. 6 shows waveform diagrams when the switching element Q1 has a short-circuit failure. (a) in FIGS. 5 and 6 is a waveform diagram of the drive signal S1 that is outputted from the second control circuit 5 to the switching element Q1. (b) in FIGS. 5 and 6 is a waveform diagram of the fifth voltage V5 that is detected by the voltage detection circuit 82. (c) in FIGS. 5 and 6 is a waveform diagram of a chopper current I1 flowing in the inductor L1.

If the switching element Q1 is normal, the fifth voltage V5 becomes a value that is dropped from the second voltage V2 (the output voltage from the DC power source circuit 2) by the amount of the DC voltage V3 (the sum of voltage drops across the respective LED elements 71), irrespective of whether the switching element Q1 is turned on or off (see (b) in FIG. 5). Further, the threshold $V_{th2}$ is set to be a value smaller than the value of the fifth voltage V5 in a normal state of the switching element Q1. On the other hand, if the switching element Q1 has a short-circuit failure, the value of the fifth voltage V5 stays at zero all the time (see (b) in FIG. 6).

As described above, the value of the fifth voltage V5 becomes a value larger than zero when the switching element Q1 is normal. In contrast, the value of the fifth voltage V5 becomes zero when the switching element Q1 has a short-circuit failure (see (b) in FIGS. 5 and 6).

In this regard, the short-circuit detection circuit 6 according to the first modification calculates the average value of the fifth voltage V5. Further, the short-circuit detection circuit 6 compares the average value of the fifth voltage V5 with the threshold value $V_{th2}$ to determine whether or not the switching element Q is in a short-circuit state. If the average value of the fifth voltage V5 is equal to or greater than the threshold value $V_{th2}$, the short-circuit detection circuit 6 determines that the switching element Q1 is in the normal state (no short-circuit). On the other hand, if the average value of the fifth voltage V5 is less than the threshold value $V_{th2}$, the short-circuit detection circuit 6 determines that the switching element Q1 is in a short-circuit state.

Further, if the short-circuit detection circuit 6 detects a short-circuit in the switching element Q1, the first control circuit 4 reduces the output of the DC power source circuit 2. As the output of the DC power source circuit 2 is reduced, the current flowing in the LED elements 71 decreases. Accordingly, when the switching element Q1 has a short-circuit failure, the lighting device 1 of the first modification can suppress the LED elements 71 from producing heat and thus can improve safety.

Figure 7:
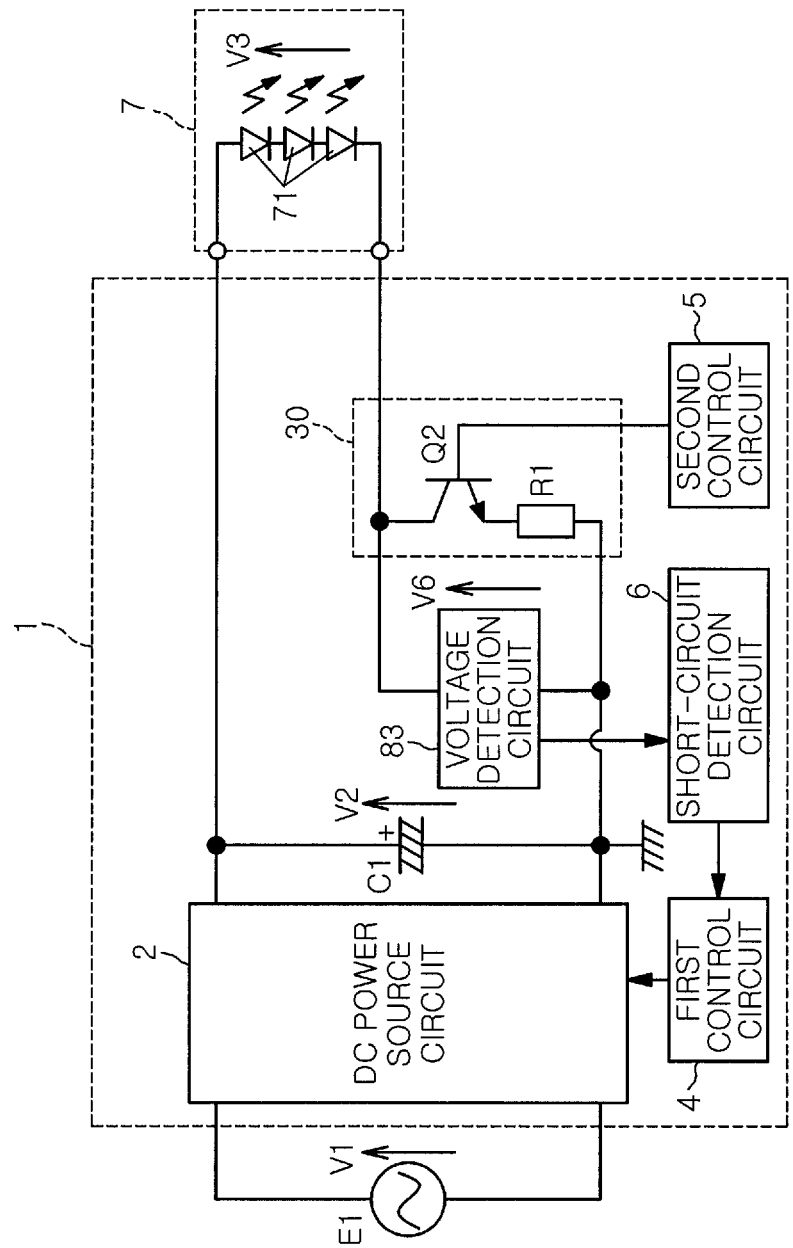
FIG. 7 is a circuit block diagram of a lighting device in accordance with another modification of the embodiment.

Next, a second modification of the lighting device 1 of the first embodiment will be described. FIG. 7 is a circuit block diagram of a lighting device 1 according to the second modification. The lighting device 1 according to the second modification includes a power conversion circuit 30 in place of the above-described power conversion circuit 3.

In contrast to the power conversion circuit 3 configured as a step-down chopper circuit, the power conversion circuit 30 is configured as an emitter follower circuit having a switching element Q2 (a semiconductor element) and a resistor R1. A series circuit of the light source 7 (LED elements 71), the switching element Q2 and the resistor R1 connected in that order is connected between the output terminals of the DC power source circuit 2 (between two terminals of the capacitor C1). The switching element Q2 is configured as an NPN bipolar transistor. The second control circuit 5 controls the conduction state of the switching element Q2 by controlling the base voltage of the switching element Q2, and thereby regulates the current flowing in the LED elements 71 to be constant.

The lighting device 1 according to the second modification further includes a voltage detection circuit 83 that detects the voltage V6 at the higher-potential terminal of the switching element Q2 (hereinafter referred to as the sixth voltage V6). The voltage detection circuit 83 outputs a detection result to the short-circuit detection circuit 6.

The short-circuit detection circuit 6 compares the detection result (the sixth voltage V6) from the voltage detection circuit 83 with a threshold value $V_{th3}$. Then, the short-circuit detection circuit 6 determines whether or not the switching element Q2 is in a short-circuit state based on the comparison result. When the switching element Q2 has a short-circuit failure, larger current flows in the series circuit of the light source 7 (LED elements 71), the switching element Q2 and the resistor R1, compared to when the switching element Q2 is normal. As the current flowing in the light source 7 (LED elements 71) increases, forward voltage of the LED elements 71 increases. For this reason, the sixth voltage V6 becomes lower than when the switching element Q2 is normal. Moreover, at the time when the output power of the DC power source circuit 2 exceeds power supply capability, the value of the second voltage V2 that is outputted from the DC power source circuit 2 decreases, and thus the sixth voltage V6 is further reduced.

In this regard, according to the second modification, the short-circuit detection circuit 6 calculates the average value of the sixth voltage V6. Further, the short-circuit detection circuit 6 compares the average value of the sixth voltage V6 with the threshold value $V_{th3}$ to determine whether or not the switching element Q2 is in a short-circuit state. If the average value of the sixth voltage V6 is equal to or greater than the threshold value $V_{th3}$, the short-circuit detection circuit 6 determines that the switching element Q2 is in the normal state (no short-circuit). On the other hand, if the average value of the sixth voltage V6 is less than the threshold value $V_{th3}$, the short-circuit detection circuit 6 determines that the switching element Q2 is in a short-circuit state.

Further, when the short-circuit detection circuit 6 detects a short-circuit in the switching element Q2, the first control circuit 4 reduces the output of the DC power source circuit 2. As the output of the DC power source circuit 2 is reduced, the current flowing in the LED elements 71 decreases. Accordingly, when the switching element Q2 has a short-circuit failure, the lighting device 1 according to the second modification can suppress the LED elements 71 from producing heat and thus can improve safety.

Alternatively, the voltage detection circuit 83 may be configured to detect the voltage at the lower-potential terminal of the switching element Q2, and the short-circuit detection circuit 6 may determine whether or not the switching element Q2 is in a short-circuit state based on a result obtained by comparing the detection result from the voltage detection circuit 83 with the threshold value.

(Embodiment 2)

Figure 8:
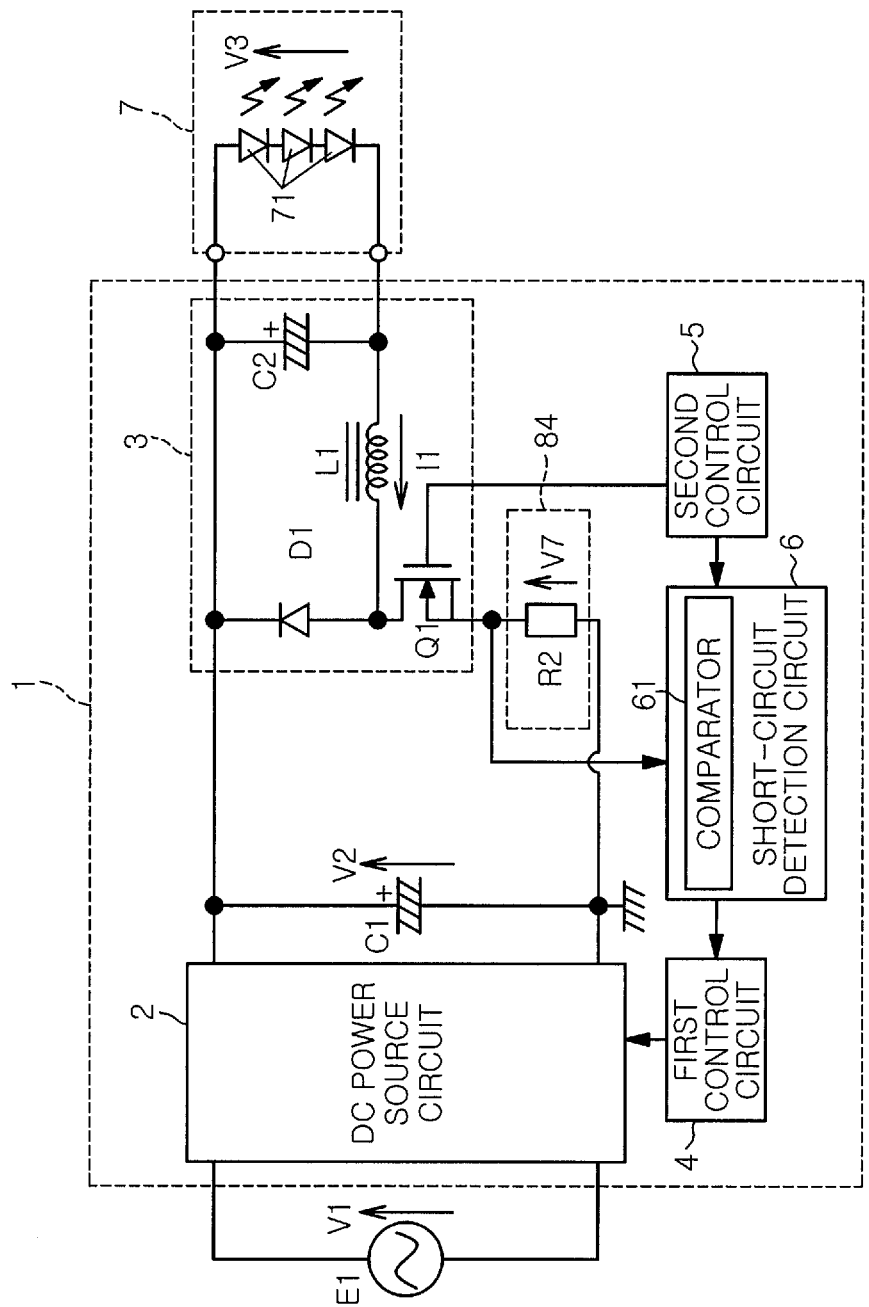
FIG. 8 is a circuit block diagram of a lighting device according to another embodiment of the present invention.

FIG. 8 is a circuit diagram of a lighting device 1 according to a second embodiment of the present invention. The lighting device 1 according to the second embodiment includes a current detection circuit 84 (a first current detection circuit) in place of the voltage detection circuit of the first embodiment. Further, the short-circuit detection circuit 6 includes a comparator 61. Other configurations except for those mentioned above are identical to those described in the first embodiment and are denoted by the like reference numerals, and therefore, redundant descriptions thereof will be omitted.

The current detection circuit 84 is configured as a resistor R2 and detects current flowing in the switching element Q1. The current detection circuit 84 is connected between the source terminal of the switching element Q1 and the ground potential of the circuit. Further, the current detection circuit 84 outputs the voltage V7 across the resistor R2 (hereinafter referred to as the seventh voltage V7) to the short-circuit detection circuit 6 as a detection value of the current flowing in the switching element Q1.

The short-circuit detection circuit 6 includes the comparator 61 to compare a detection result (the seventh voltage V7) by the current detection circuit 84 with a threshold value $V_{th4}$ (a second threshold value). The comparator 61 outputs an output signal S2, the signal level of which is set based on the comparison result between the seventh voltage V7 and the threshold value $V_{th4}$. Specifically, if the seventh voltage V7 is equal to or greater than the threshold value $V_{th4}$, the comparator 61 sets the signal level of the output signal S2 to H-level. In addition, if the seventh voltage V7 is less than the threshold value $V_{th4}$, the comparator 61 sets the signal level of the output signal S2 to L-level.

Further, the short-circuit detection circuit 6 determines whether or not the switching element Q1 is in a short-circuit state, based on the duration of the time period in which the seventh voltage V7 is equal to or greater than the threshold value $V_{th4}$, namely, the time period T1 in which the output signal S2 stays at H-level (hereinafter referred to as H-level time period T1).

Figure 9:
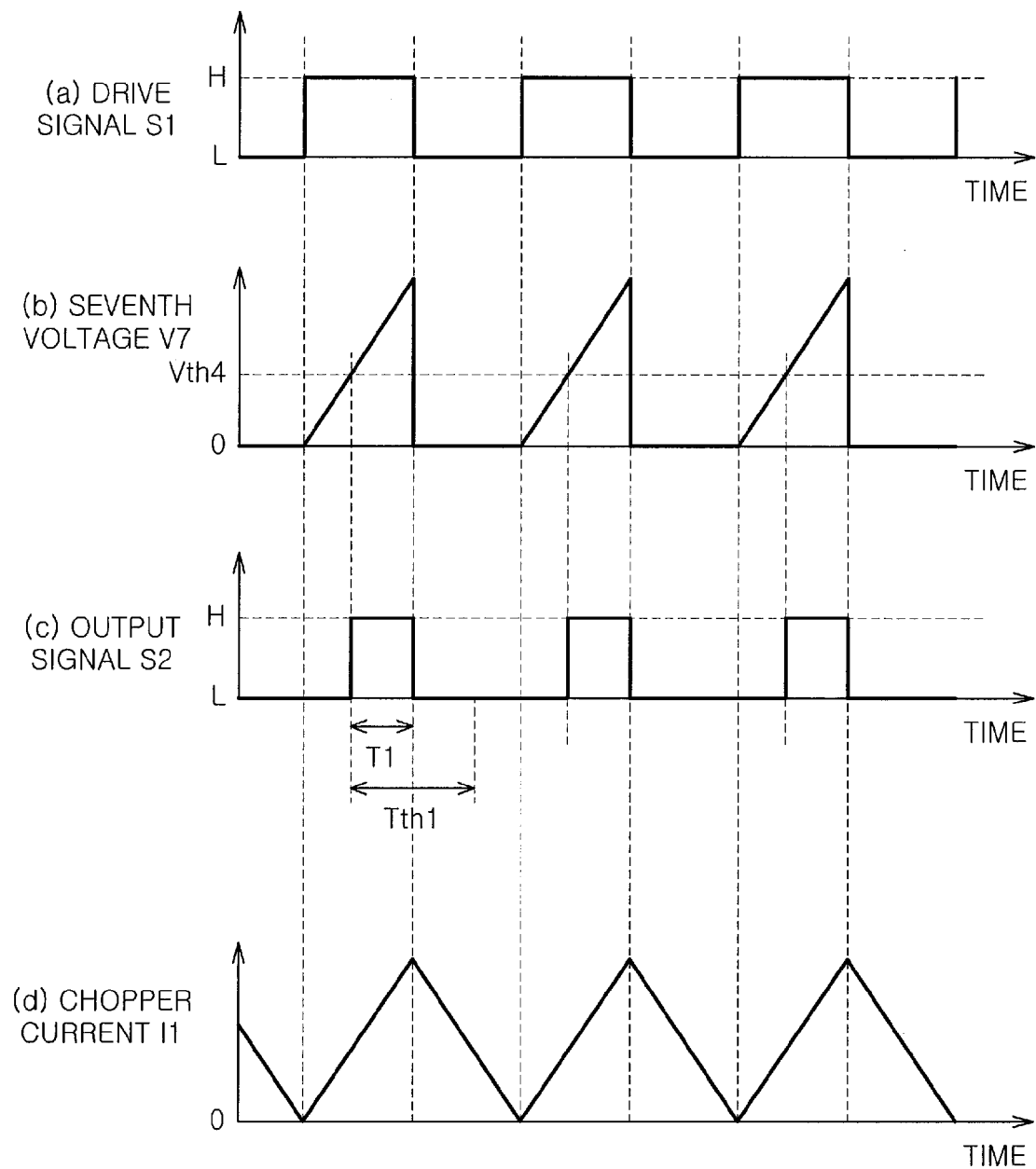
FIG. 9 shows waveform diagrams when a switching element included in the lighting device in accordance with the another embodiment is normal, wherein (a) is a waveform diagram of a drive signal S1, (b) is a waveform diagram of a seventh voltage V7, (c) is a waveform diagram of an output signal S2, and (d) is a waveform diagram of a chopper current I1.
Figure 10:
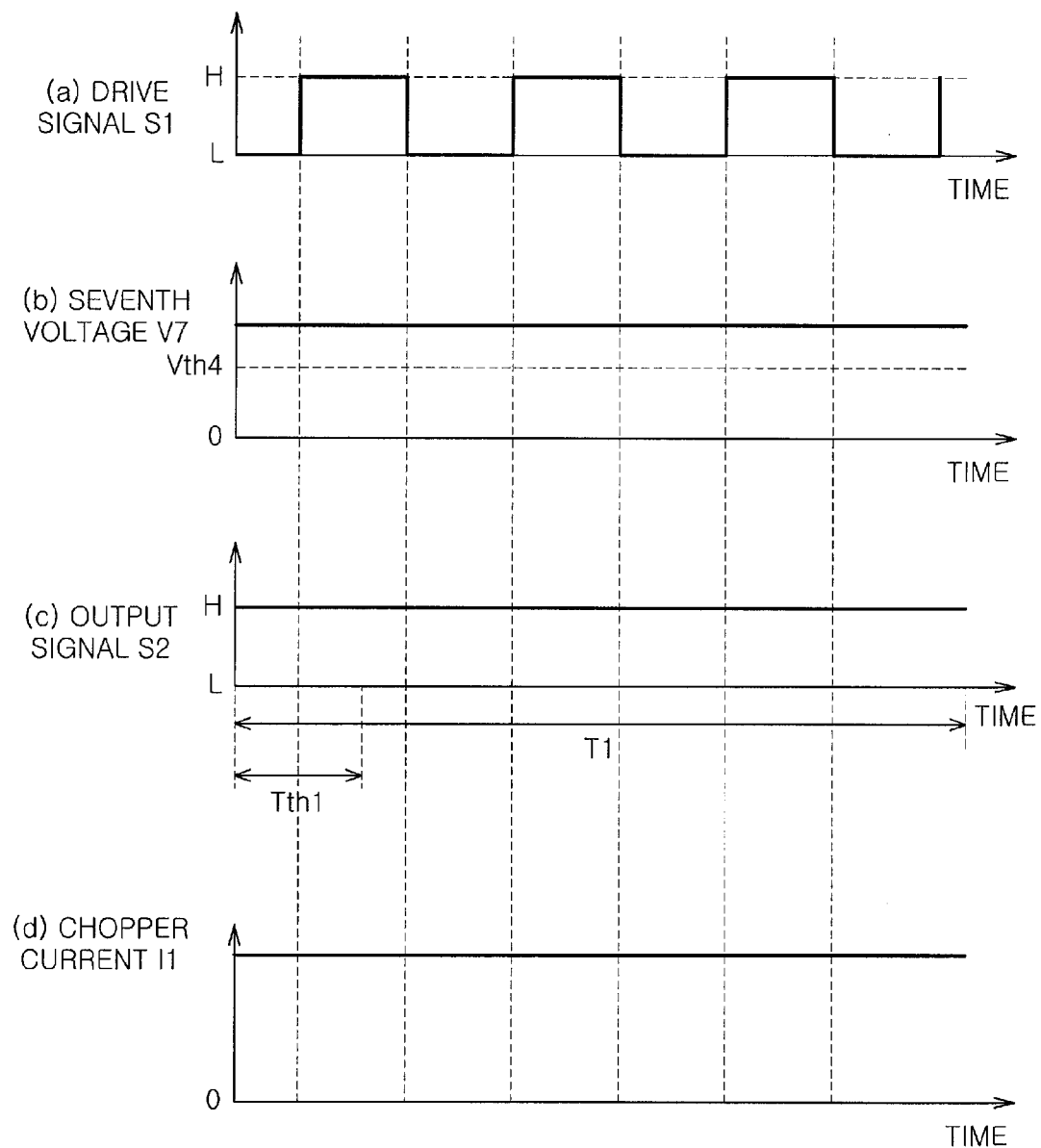
FIG. 10 shows waveform diagrams when the switching element included in the lighting device in accordance with the another embodiment has a short-circuit failure, wherein (a) is a waveform diagram of the drive signal S1, (b) is a waveform diagram of the seventh voltage V7, (c) is a waveform diagram of the output signal S2, and (d) is a waveform diagram of the chopper current I1.

In the following descriptions, it will be described how the short-circuit detection circuit 6 detects a short-circuit in the switching element Q1, with reference to waveform diagrams illustrated in FIGS. 9 and 10. FIG. 9 shows waveform diagrams when the switching element Q1 is normal, i.e., when the switching element Q1 has no short-circuit failure. FIG. 10 shows waveform diagrams when the switching element Q1 has a short-circuit failure. (a) in FIGS. 9 and 10 is a waveform diagram of the drive signal S1 that is outputted from the second control circuit 5 to the switching element Q1. (b) in FIGS. 9 and 10 is a waveform diagram of the seventh voltage V7 that is detected by the current detection circuit 84. (c) in FIGS. 9 and 10 is a waveform diagram of the output signal S2 that is outputted from the comparator 61. (d) in FIGS. 9 and 10 is a waveform diagram of a chopper current I1 flowing in the inductor L1.

First, the operation when the switching element Q1 is in a normal state (no short-circuit) will be described.

When the drive signal S1 is at H-level, the switching element Q1 is turned on. As the switching element Q1 is turned on, the seventh voltage V7 (current flowing in the switching element Q1) and the chopper current I1 increase linearly (see (b) and (d) in FIG. 9). Then, if the seventh voltage V7 becomes equal to or greater than the threshold value $V_{th4}$, the output signal S2 of the comparator 61 is switched from L-level to H-level (see (c) in FIG. 9).

Then, when the drive signal S1 is switched from H-level to L-level, the switching element Q1 is turned off. As the switching element Q1 is turned off, the seventh voltage V7 (the current flowing in the switching element Q1) becomes zero (see (b) in FIG. 9). Additionally, as the switching element Q1 is turned off, the chopper current I1 decreases linearly (see (d) in FIG. 9).

Next, the operation when the switching element Q1 has a short-circuit failure will be described.

If the switching element Q1 has a short-circuit failure, the switching element Q1 stays in the on-state all the time, irrespective of the signal level of the drive signal S1. In this case, DC current determined by the power supply capability of the DC power source circuit 2 continues to flow in the LED elements 71, the inductor L1 and the switching element Q1, and the seventh voltage V7 stays higher than the threshold value $V_{th4}$ all the time (see (b) and (d) in FIG. 10). Accordingly, the signal level of the output signal S2 of the comparator 61 stays at H-level all the time (see (c) in FIG. 10).

As described above, when the switching element Q1 is normal, the output signal S2 alternates between H-level and L-level (see (c) in FIG. 9). On the other hand, when the switching element Q1 has a short-circuit failure, the output signal S2 stays at H-level all the time (see (c) in FIG. 10).

In this regard, the short-circuit detection circuit 6 in this embodiment determines whether or not the switching element Q1 is in a short-circuit state, based on the duration of the time period T1 in which the output signal S2 stays at H-level (the H-level time period T1). When the duration of the H-level time period T1 is less than a threshold value $T_{th1}$, namely, if the output signal S2 is switched to L level before the H-level time period T1 exceeds a predetermined time period, the short-circuit detection circuit 6 determines that the switching element Q1 is in the normal state. On the other hand, when the length of the H-level time T1 is equal to or greater than the threshold $T_{th1}$, the short-circuit detection circuit 6 determines that the switching element Q1 is in a short-circuit state.

Further, if the short-circuit detection circuit 6 detects a short-circuit in the switching element Q1, the first control circuit 4 reduces the output of the DC power source circuit 2. As the output of the DC power source circuit 2 is reduced, the current flowing in the LED elements 71 decreases. Accordingly, when the switching element Q2 has a short-circuit failure, the lighting device 1 according to the second embodiment can suppress the LED elements 71 from producing heat and thus can improve safety.

It is to be understood that methods of determining whether or not the switching element Q1 is in a short-circuit state are not limited to those described above.

For example, the short-circuit detection circuit 6 may be configured to average the signal levels of the output signal S2 and determine whether or not the switching element Q1 is in a short-circuit state, based on a comparison result between the average value of the output signal S2 and the threshold value. If the average value of the output signal S2 is less than the threshold value, the short-circuit detection circuit 6 determines that the switching element Q1 is in the normal state. On the other hand, if the average value of the output signal S2 is equal to or greater than the threshold value, the short-circuit detection circuit 6 determines that the switching element Q1 is in a short-circuit state.

Further, the short-circuit detection circuit 6 may be configured to determine whether or not the switching element Q1 is in a short-circuit state, based on intervals at which the signal level of the output signal S2 is switched from one to another. If the signal level of the output signal S2 is switched from H-level to L-level or vice versa within a predetermined time period, the short-circuit detection circuit 6 determines that the switching element Q1 is in the normal state. On the other hand, if the signal level of the output signal S2 is not switched from H-level to L-level or vice versa even after a predetermined time period has lapsed, the short-circuit detection circuit 6 determines that the switching element Q1 is in a short-circuit state.

Furthermore, the short-circuit detection circuit 6 may be configured to determine whether or not the switching element Q1 is in a short-circuit state, based on the signal level of the output signal S2 at the time when the signal level of the drive signal S1 is switched from L-level to H-level. If the signal level of the output signal S2 is L-level at the time when the signals level of the drive signal S1 is switched from L-level to H-level, the short-circuit detection circuit 6 determines that the switching element Q1 is in the normal state (see (a) and (c) in FIG. 9). On the other hand, if the signal level of the output signal S2 is H-level at the time when the signal level of the drive signal S1 is switched from L-level to H-level, the short-circuit detection circuit 6 determines that the switching element Q1 is in a short-circuit state (see (a) and (c) in FIG. 10).

(Embodiment 3)

Figure 11:
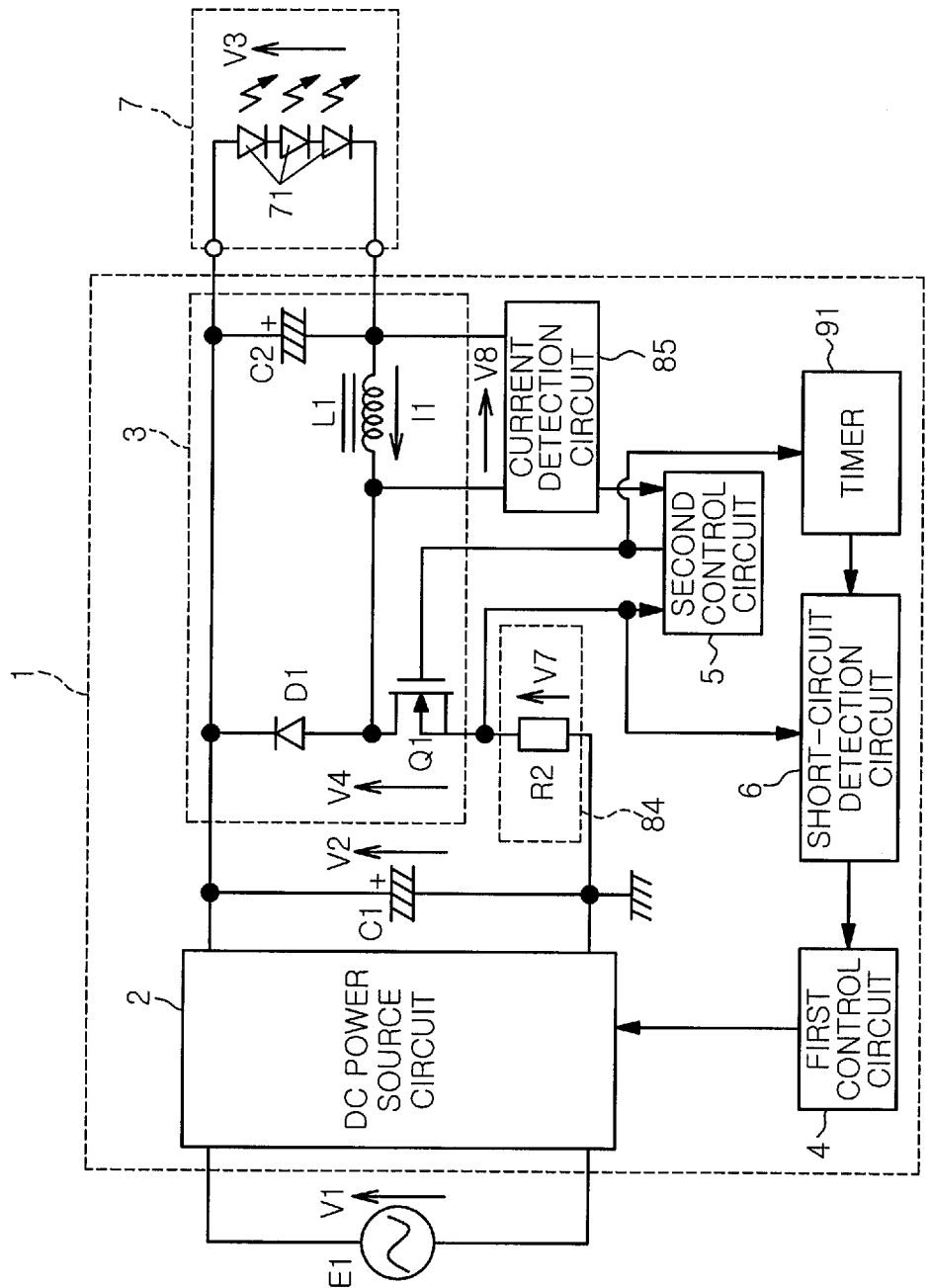
FIG. 11 is a circuit block diagram of a lighting device in accordance with a still another embodiment of the present invention.

FIG. 11 is a circuit diagram of a lighting device 1 according to a third embodiment of the present invention. The lighting device 1 according to the third embodiment includes a current detection circuit 85 (a second current detection circuit) and a timer 91 (a first timer), in addition to the configurations included in the lighting device 1 of the second embodiment. Moreover, the lighting device 1 according to the third embodiment is different from that of the second embodiment in terms of the way how to control the switching of the switching element Q1 by the second control circuit 5 and the way how to determine whether or not the switching element Q1 is in a short-circuit state by the short-circuit detection circuit 6. The other configurations except for those mentioned above are identical to those described in the second embodiment and are denoted by the like reference numerals, and therefore, redundant descriptions thereof will be omitted.

The current detection circuit 85 detects a chopper current I1 flowing in the inductor L1. Specifically, the current detection circuit 85 detects a voltage V8 across the inductor L1 (hereinafter referred to as an eighth voltage V8) to thereby determine whether or not current is flowing in the inductor L1.

Figure 12:
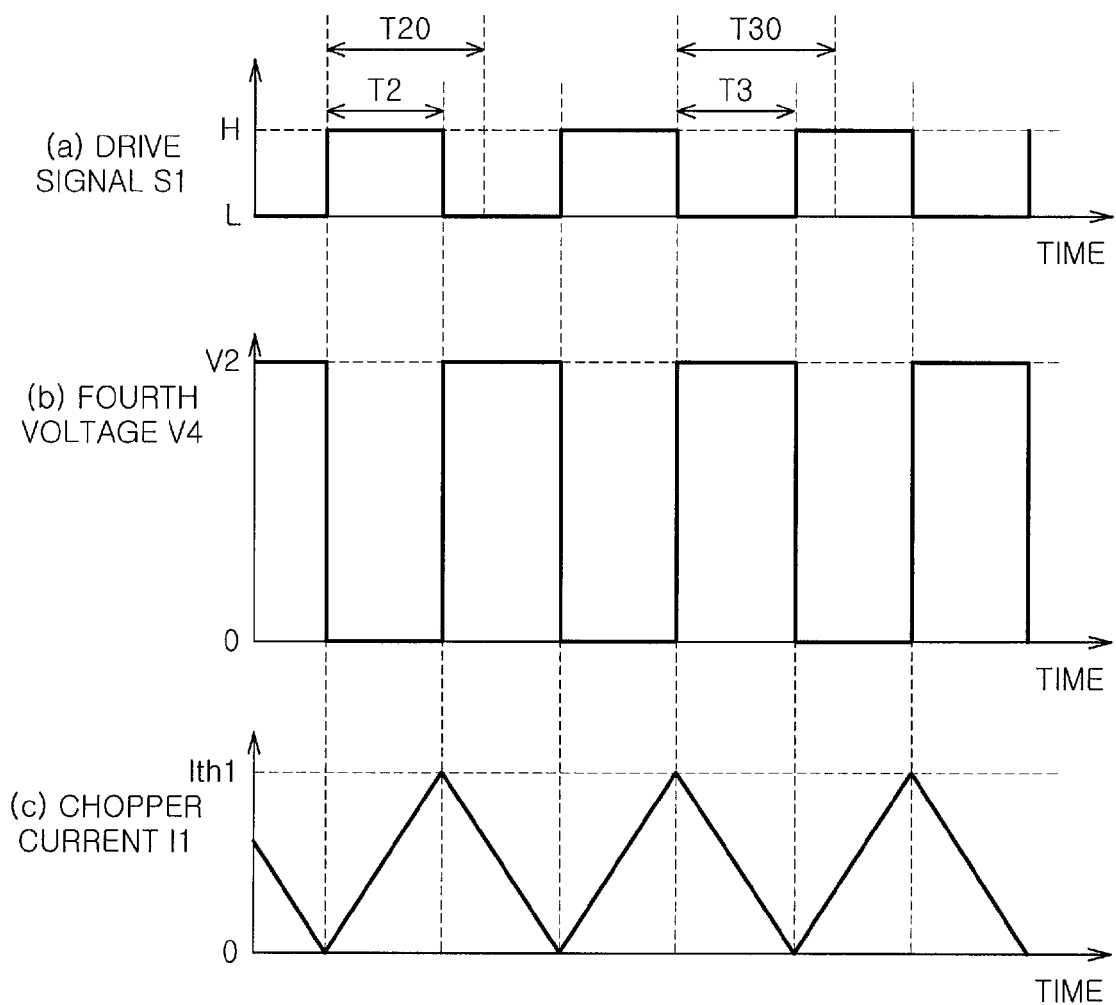
FIG. 12 shows waveform diagrams when a switching element included in the lighting device in accordance with the still another embodiment is normal, wherein (a) is a waveform diagram of a drive signal S1, (b) is a waveform diagram of a fourth voltage V4, and (c) is a waveform diagram of a chopper current I1.

In addition, the second control circuit 5 controls the switching of the switching element Q1 based on a detection result (the seventh voltage V7) of the current detection circuit 84 and a detection result of the current detection circuit 85 (the eighth voltage V8). In the following descriptions, it will be described how the switching of the switching element Q1 is controlled, with reference to waveform diagrams illustrated in FIG. 12. (a) in FIG. 12 is a waveform diagram of the drive signal S1 that is outputted from the second control circuit 5 to the switching element Q1. (b) in FIG. 12 is a waveform diagram of the fourth voltage V4. (c) in FIG. 12 is a waveform diagram of the chopper current I1 flowing in the inductor L1.

The second control circuit 5 determines the timing to turn off the switching element Q1 based on a detection result (the seventh voltage V7) of the current detection circuit 84. Further, the second control circuit 5 determines the timing to turn on the switching element Q1 based on a detection result (the eighth voltage V8) of the current detection circuit 85. Specifically, the second control circuit 5 turns off the switching element Q1 when the seventh voltage V7 reaches a predetermined value. In other words, the second control circuit 5 turns off the switching element Q1 when the current flowing in the switching element Q1 (the chopper current I1 at the time when the switching element Q1 is turned on) reaches a threshold value $I_{th1}$ (see (a) and (c) in FIG. 12). As the switching element Q1 is turned off, the chopper current I1 decreases linearly. When the chopper current I1 becomes lower than zero, the polarity of the eighth voltage V8 is inverted so that it becomes lower than a predetermined value. If the value of the eighth voltage V8 becomes lower than the predetermined value, namely, the chopper current I1 becomes zero, the second control circuit 5 turns on the switching element Q1 (see (a) and (c) in FIG. 12). In this manner, the second control circuit 5 controls the switching of the switching element Q1 in a critical mode, and the chopper current I1 becomes a triangular wave (see (c) in FIG. 12).

Further, the timer 91 starts to count when the second control circuit 5 outputs an on-signal (the drive signal S1 of H-level) to turn on the switching element Q1. In addition, the timer 91 resets the counted value when the detection result (the seventh voltage V7) of the current detection circuit 84 reaches a predetermined value. That is, the timer 91 resets the counted value when the second control circuit 5 outputs an off-signal (the drive signal S1 of L-level) to turn off the switching element Q1. In this manner, the timer 91 measures the duration of the time period T2 in which the drive signal S1 is set to H-level (hereinafter referred to as a H-level time period T2).

Here, the second control circuit 5 has an upper limit value T20 (a third threshold) of the H-level time period T2 in which the drive signal S1 is set to H-level. Further, the second control circuit 5 has an upper limit value T30 of the L-level time period T3 in which the drive signal S1 is set to L level. Further, the second control circuit 5 forcibly switches the signal level of the drive signal S1 to L-level when the H-level time period T2 exceeds the upper limit value T20. In addition, the second control circuit 5 forcibly switches the signal level of the drive signal S1 to H-level when the L level time period T3 exceeds the upper limit value T30.

For example, if a transitional change occurs in the power supplied to the light source 7 so that an instantaneous voltage drop occurs in the second voltage V2 outputted from the DC power source circuit 2, there is a concern that the chopper current I1 may not reach the threshold value $I_{th1}$. When this happens, the second control circuit 5 forcibly switches the signal level of the drive signal S1 to L-level if the H-level time period T2 exceeds the upper limit value T20, and thereby forcibly turns off the switching element Q1 and reduces the output current.

Figure 13:
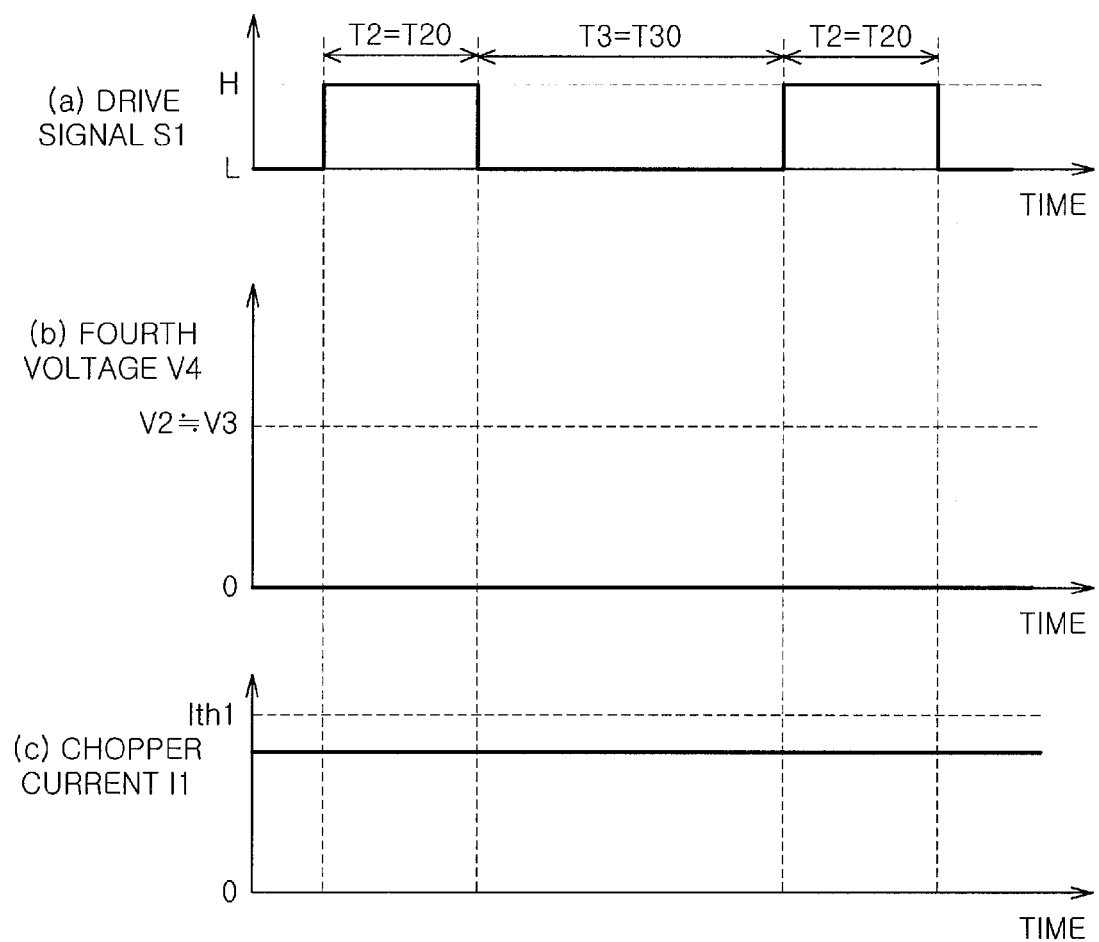
FIG. 13 shows waveform diagrams when the switching element included in the lighting device in accordance with the still another embodiment has a short-circuit failure, wherein (a) is a waveform diagram of the drive signal S1, (b) is a waveform diagram of the fourth voltage V4, and (c) is a waveform diagram of the chopper current I1.

Next, the operation when the switching element Q1 has a short-circuit failure will be described, with reference to waveform diagrams illustrated in FIG. 13. (a) in FIG. 13 is a waveform diagram of the drive signal S1 that is outputted from the second control circuit 5 to the switching element Q1. (b) in FIG. 13 is a waveform diagram of the fourth voltage V4. (c) in FIG. 13 is a waveform diagram of the chopper current I1 flowing in the inductor L1.

As a short-circuit occurs in the switching element Q1, the value of the second voltage V2 that is outputted from the DC power source circuit 2 decreases until it becomes approximately the same value as the DC voltage V3 (the sum of the voltage drops across the respective LED elements 71) (see (b) in FIG. 13). In addition, the DC current determined by the power supply capability of the DC power source circuit 2 continues to flow in the inductor L1, and thus the value of the chopper current I1 becomes a substantially constant value that is lower than the threshold value $I_{th1}$. For this reason, the second control circuit 5 repeats the operation of switching the signal level of the drive signal S1 to L-level when the H-level time period T2 exceeds the upper limit value T20 and the operation of switching the signal level of the drive signal S1 to H-level when the L-level time period T3 exceeds the upper limit value T30 (see (a) in FIG. 13).

Next, detecting a short-circuit in the switching element Q1 by the short-circuit detection circuit 6 will be described.

As described above, the timer 91 starts to count when the second control circuit 5 outputs an on-signal (the drive signal S1 of H-level) to turn on the switching element Q1. Further, the timer 91 resets the counted value when the second control circuit 5 outputs an off-signal (the drive signal S1 of L-level) to turn off the switching element Q1. The detection result (the seventh voltage V7) of the current detection circuit 84 and the value counted by the timer 91 are inputted to the short-circuit detection circuit 6. Then, the short-circuit detection circuit 6 determines whether or not the switching element Q1 is in a short-circuit state based on the detection result of the current detection circuit 84 and the value counted by the timer 91. Specifically, if the seventh voltage V7 reaches a predetermined value (if the chopper current I1 reaches the threshold value $I_{th1}$) while the timer 91 is counting, the short-circuit detection circuit 6 determines that the switching element Q1 is in the normal state. On the other hand, if the seventh voltage V7 does not reach a predetermined value (if the chopper current I1 does not reach the threshold value $I_{th1}$) while the timer 91 is counting, the short-circuit detection circuit 6 determines that the switching element Q1 is in a short-circuit state.

That is to say, if the value counted by the timer 91 exceeds the upper limit value T20 (the third threshold value) of the H-level time period T2, the short-circuit detection circuit 6 determines that the switching element Q1 is in a short-circuit state.

In this embodiment, if the value counted by the timer exceeds the upper limit T20 several times, the short-circuit detection circuit 6 determines that the switching element Q1 is in a short-circuit state. By doing so, for example, even if an instantaneous voltage drop occurs in the second voltage V2, it is possible to prevent the short-circuit detection circuit 6 from making erroneous determination.

Further, when the short-circuit detection circuit 6 detects a short-circuit in the switching element Q1, the first control circuit 4 reduces the output of the DC power source circuit 2. As the output of the DC power source circuit 2 is reduced, the current flowing in the LED elements 71 decreases. Accordingly, when the switching element Q2 has a short-circuit failure, the lighting device according to the third embodiment can suppress the LED elements 71 from producing heat and thus can improve safety.

Figure 14:
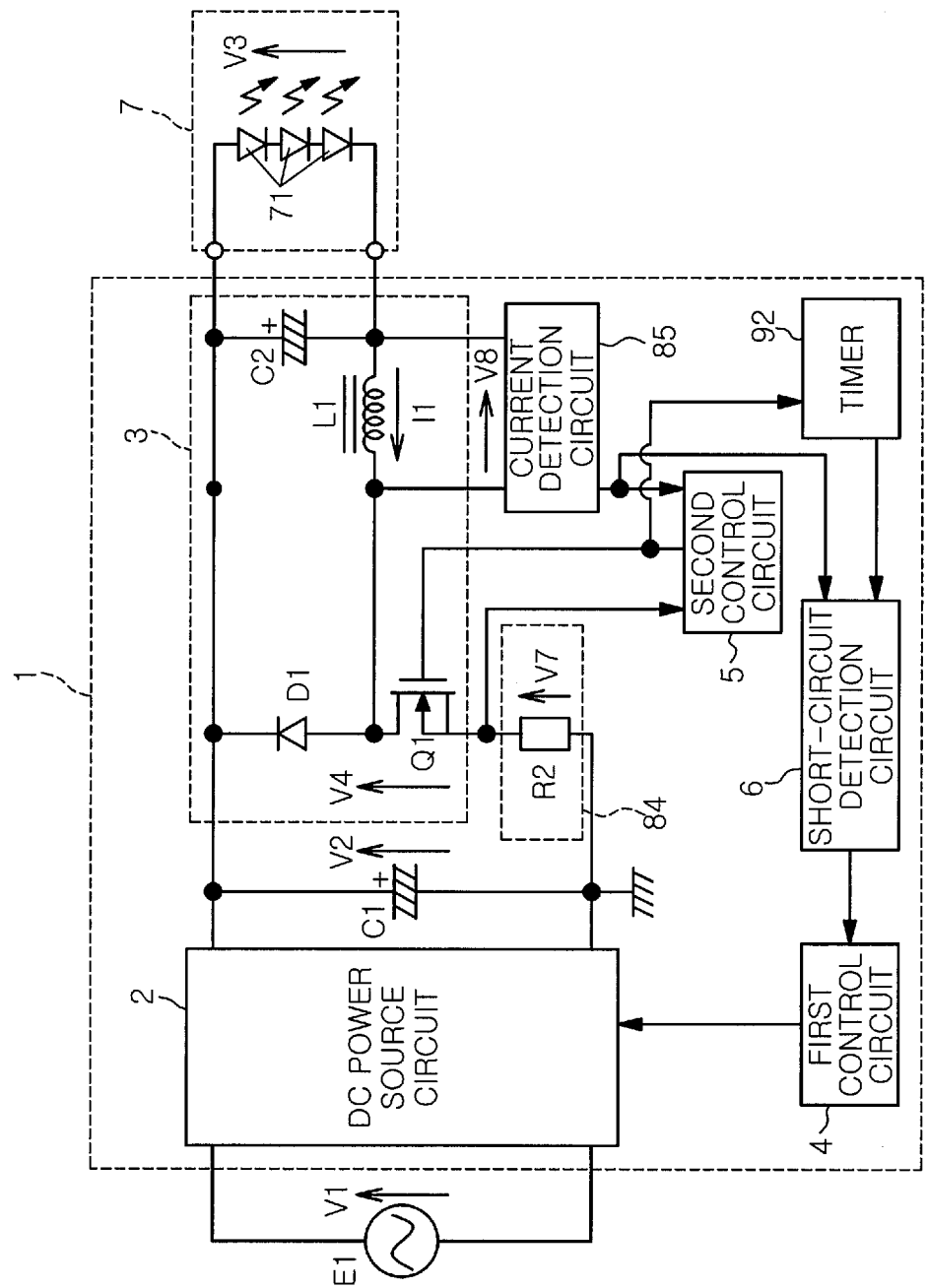
FIG. 14 is a circuit block diagram of a lighting device in accordance with a modification of the still another embodiment.

Next, a modification of the lighting device of the third embodiment will be described. FIG. 14 is a circuit block diagram of a lighting device 1 according to this modification. The lighting device 1 according to this modification includes a timer 92 (a second timer) in place of the timer 91, and accordingly the way how to determine whether or not the switching element Q1 is in a short-circuit state by the short-circuit detection circuit 6 is different from that described above.

The timer 92 starts to count when the second control circuit 5 outputs an on-signal (the drive signal S1 of H-level) to turn on the switching element Q1. Further, the timer 92 resets the counted value if the detection result (the eighth voltage V8) of the current detection circuit 85 becomes lower than a predetermined value, namely, if the second control circuit 5 outputs an on-signal to turn on the switching element Q1 again. That is to say, the timer 92 measures a period T4 of the drive signal S1.

Figure 15:
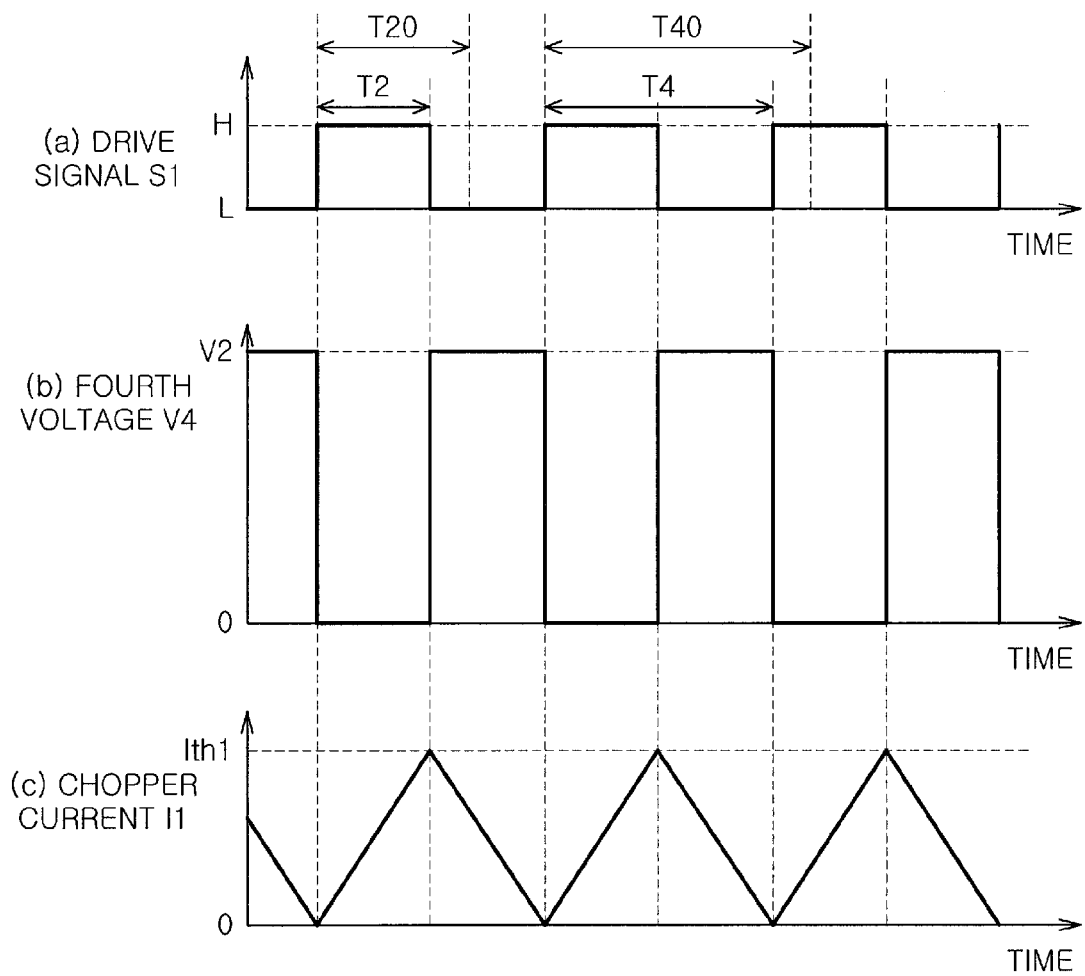
FIG. 15 shows waveform diagrams when a switching element included in the lighting device in accordance with the modification of the still another embodiment is normal, wherein (a) is a waveform diagram of a drive signal S1, (b) is a waveform diagram of a fourth voltage V4, and (c) is a waveform diagram of a chopper current I1.

Next, controlling the switching of the switching element Q1 in this modification will be described, with reference to FIG. 15. (a) in FIG. 15 is a waveform diagram of the drive signal S1 that is outputted from the second control circuit 5 to the switching element Q1. (b) in FIG. 15 is a waveform diagram of the fourth voltage V4. (c) in FIG. 15 is a waveform diagram of the chopper current I1 flowing in the inductor L1.

Similarly to the above, the second control circuit 5 in this modification controls the switching of the switching element Q1 in a critical mode. In addition, the second control circuit 5 in this modification has an upper limit value T40 (a fourth threshold value) of the period T4 of the drive signal S1, instead of the upper limit value T30 of the L-level time period T3. Further, the second control circuit 5 forcibly switches the signal level of the drive signal S1 to L-level when the H-level time period T2 exceeds the upper limit value T20. In addition, the second control circuit 5 forcibly switches the signal level of the drive signal S1 to H-level when the period T4 of the drive signal S1 exceeds the upper limit value T40.

For example, if a voltage across the capacitor C2 is low when the power conversion circuit 3 starts up, there is a concern that a change in the eighth voltage V8 is so small that the second control circuit 5 may not be able to detect that the chopper current I1 has become zero. When this happens, the second control circuit 5 forcibly switches the signal level of the drive signal S1 to H-level if the period T4 of the drive signal S1 exceeds the upper limit value T40, and thereby allows the switching operations of the switching element Q1 to be continued.

Next, detecting a short-circuit in the switching element Q1 by the short-circuit detection circuit 6 according to this modification will be described.

Figure 16:
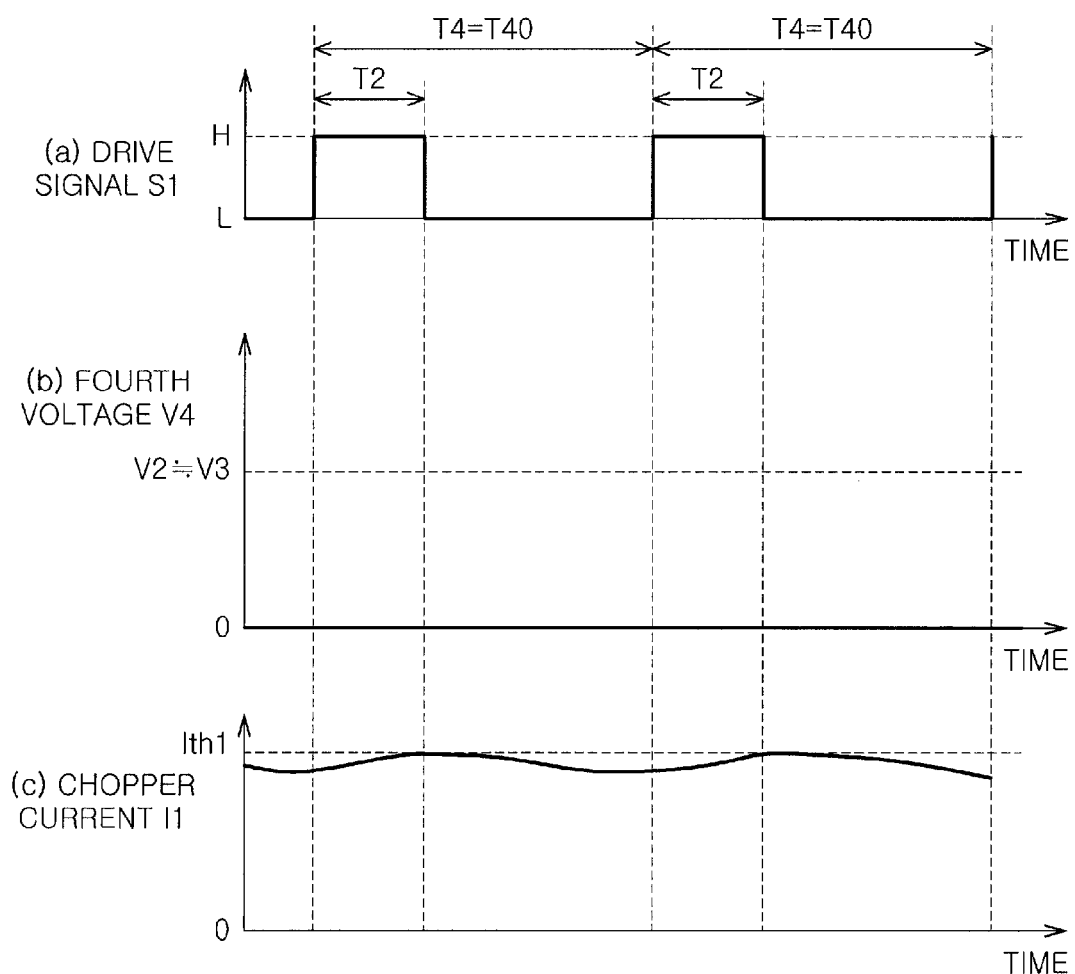
FIG. 16 shows waveform diagrams when the switching element included in the lighting device in accordance with the modification of the still another embodiment has a short-circuit failure, wherein (a) is a waveform diagram of the drive signal S1, (b) is a waveform diagram of the fourth voltage V4, and (c) is a waveform diagram of the chopper current I1.

FIG. 16 shows waveform diagrams when the switching element Q1 has a short-circuit failure. (a) in FIG. 16 is a waveform diagram of the drive signal S1 that is outputted from the second control circuit 5 to the switching element Q1. (b) in FIG. 16 is a waveform diagram of the fourth voltage V4. (c) in FIG. 16 is a waveform diagram of the chopper current I1 flowing in the inductor L1.

As illustrated in (c) in FIG. 16, in the case where the switching element Q1 has a short-circuit failure, if the chopper current I1 becomes a value close to the threshold value $I_{th1}$, an off-signal may be outputted from the second control circuit 5 before the H-level time period T2 exceeds the upper limit value T20. In this case, if the timer 91 that measures the H-level time period T2 is used for determining whether or not the switching element Q1 is in a short-circuit state, there is a concern that the switching element Q1 is erroneously determined to be in the normal state even though the switching element Q1 is short-circuited.

In this modification, the detection result (the eighth voltage V8) of the current detection circuit 85 and the value counted by the timer 92 are inputted to the short-circuit detection circuit 6. Then, the short-circuit detection circuit 6 determines whether or not the switching element Q1 is in a short-circuit state based on the detection result of the current detection circuit 85 and the value counted by the timer 92. Specifically, if the eighth voltage V8 becomes zero (if the chopper current I1 becomes zero) while the timer 92 is counting, the short-circuit detection circuit 6 determines that the switching element Q1 is in the normal state. On the other hand, if the eighth voltage V8 does not become zero (if the chopper current I1 does not become zero) while the timer 92 is counting, the short-circuit detection circuit 6 determines that the switching element Q1 is in a short-circuit state.

That is, if the value counted by the timer 92 exceeds the upper limit value T40 (the fourth threshold value) of the period T4 of the drive signal S1, the short-circuit detection circuit 6 determines that the switching element Q1 is in a short-circuit state.

Further, when the short-circuit detection circuit 6 detects a short-circuit in the switching element Q1, the first control circuit 4 reduces the output of the DC power source circuit 2. As the output of the DC power source circuit 2 is reduced, current flowing in the LED elements 71 decreases. Accordingly, when the switching element Q2 has a short-circuit failure, the lighting device 1 according to this modification can suppress the LED elements 71 from producing heat and thus can improve safety.

As described above, according to this modification, it is determined whether or not the switching element Q1 is in a short-circuit state using the timer 92 to measure the period T4 of the drive signal S1. Accordingly, in the case where the switch element Q1 has a short-circuit failure and the chopper current I1 becomes a value close to the threshold value $I_{th}$, it is possible to prevent erroneous determination that the switching element Q1 is in the normal state even though the switching element Q1 is short-circuited.

Further, as described above, since the voltage across the capacitor C2 is low immediately after the power conversion circuit 3 has started up, there is a concern that the period T4 of the drive signal S1 may exceed the upper limit value T40. For this reason, it may be desirable that the short-circuit detection circuit 6 does not detect a short-circuit possibly in the switching element Q1 until enough time lapses for the voltage across the capacitor C2 to increase after the power conversion circuit 3 has started up.

(Embodiment 4)

Figure 17:
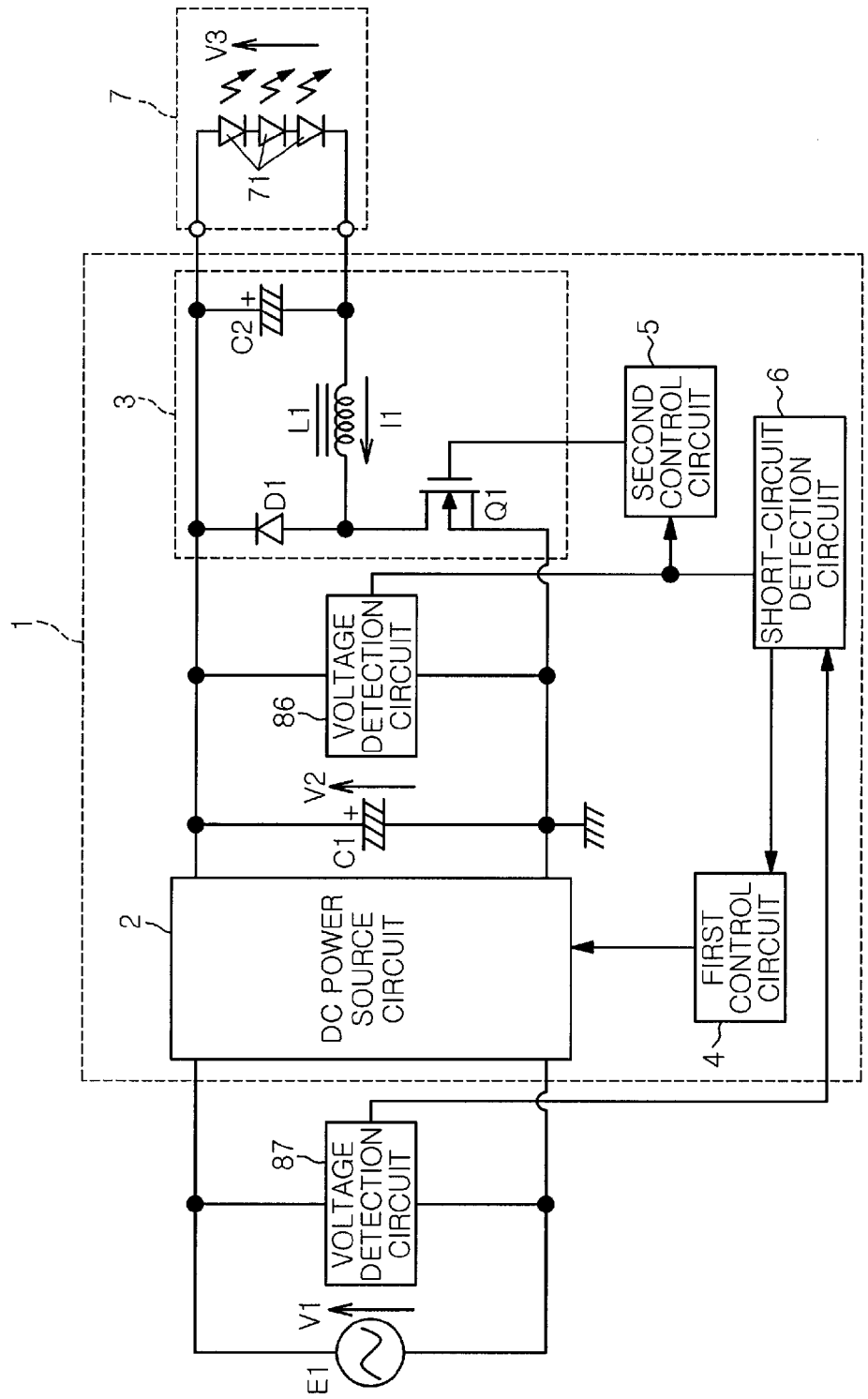
FIG. 17 is a circuit block diagram of a lighting device in accordance with a still yet another embodiment of the present invention.

FIG. 17 is a circuit block diagram of a lighting device 1 according to a fourth embodiment of the present invention. The lighting device 1 according to the fourth embodiment includes a voltage detection circuit 86 (a second voltage detection circuit) and a voltage detection circuit 87, in place of the voltage detection circuit 81 in the first embodiment. Moreover, the lighting device 1 according to the fourth embodiment is different from that of the first embodiment in terms of the way how to control the switching of the switching element Q1 by the second control circuit 5 and the way how to determine whether or not the switching element Q1 is in a short-circuit state by the short-circuit detection circuit 6. The other configurations except for those mentioned above are identical to those described in the first embodiment and are denoted by the like reference numerals, and therefore, redundant descriptions thereof will be omitted.

The voltage detection circuit 86 detects the output voltage (the second voltage V2) from the DC power source circuit 2 and outputs a detection result to the second control circuit 5 and the short-circuit detection circuit 6. The voltage detection circuit 87 detects an input voltage (the first voltage V1) to the DC power source circuit 2 and outputs a detection result to the short-circuit detection circuit 6.

If the detection result (the second voltage V2) of the voltage detection circuit 86 is equal to or greater than a predetermined value, the second control circuit 5 turns on/off the switching element Q1 by outputting the drive signal S1 alternating between H-level and L-level to the switching element Q1. On the other hand, if the detection result (the second voltage V2) of the voltage detection circuit 86 is less than the predetermined value, the second control circuit 5 sets the signal level of the drive signal S1 outputted to the switching element Q1 to L-level for a predetermined time period, namely, outputs an off-signal for the predetermined time period, and temporarily stops turning on/off the switching element Q1. That is to say, when the second voltage V2 decreases, the second control circuit 5 forces the switching element Q1 to stay in the off state.

For example, if the second voltage V2 has decreased due to a transitional change in the output power supplied to the light source 7, the switching element Q1 is forced to be turned off, so that the supply current to the light source 7 is reduced and the second voltage V2 returns to the original value. Then, when the second voltage V2 returns to be equal to or greater than a predetermined value within a predetermined time period, the second control circuit 5 resumes the turning on/off of the switching element Q1.

If the switching element Q1 has a short-circuit failure, however, the value of the second voltage V2 decreases until it becomes approximately the same value as the DC voltage V3 (the sum of voltage drops across the respective LED elements 71), so that the second voltage V2 does not return (see (b) in FIG. 3).

In this regard, the short-circuit detection circuit 6 determines whether or not the switching element Q1 is in a short-circuit state based on the second voltage V2 while the second control circuit 5 forces the switching element Q1 to stay in the off state. Specifically, the short-circuit detection circuit 6 compares the detection result (the second voltage V2) of the voltage detection circuit 86 with a threshold value $V_{th5}$ (a fifth threshold value) while the second control circuit 5 is outputting an off signal for a predetermined time period. If the detection result (the second voltage V2) of the voltage detection circuit 86 becomes equal to or greater than the threshold value $V_{th5}$, the short-circuit detection circuit 6 determines that the switching element Q1 is in the normal state. On the other hand, if the detection result (the second voltage V2) by the voltage detection circuit 86 is less than the threshold value $V_{th5}$, the short-circuit detection circuit 6 determines that the switching element Q1 is in a short-circuit state.

When the short-circuit detection circuit 6 detects a short-circuit in the switching element Q1, the first control circuit 4 reduces the output of the DC power source circuit 2. As the output of the DC power source circuit 2 is reduced, current flowing in the LED elements 71 decreases. Accordingly, when the switching element Q2 has a short-circuit failure, the lighting device 1 according to the fourth embodiment can suppress the LED elements 71 from producing heat and thus can improve safety.

Additionally, the short-circuit detection circuit 6 may additionally consider whether or not the detection result of the voltage detection circuit 87 is equal to or greater than a predetermined value, in determining whether or not the switching element Q1 is in a short-circuit state. For example, if the first voltage V1 decreases greatly for some reasons, so does the second voltage V2. In this case, even if the switching element Q1 is normal, the second voltage V2 does not return. Accordingly, there is a concern that the short-circuit detection circuit 6 erroneously determines that the switching element Q1 is in a short-circuit state. Therefore, the short-circuit detection circuit 6 may be configured to determine that the switching element Q1 is in a short-circuit state, when the detection result of the voltage detection circuit 86 is less than the threshold value $V_{th5}$ and the detection result of the voltage detection circuit 87 is equal to or greater than a predetermined value while the second control circuit 5 outputs an off-signal. With this configuration, it is possible to prevent the short-circuit detection circuit 6 from making erroneous determination when the first voltage V1 decreases.

As described thus far, in the first to fourth embodiments, the power conversion circuit 3 that is configured as a step-down chopper circuit has been used. However, the power conversion circuit 3 may be configured as other chopper circuits (such as a step-up chopper circuit and a step-up and step-down chopper circuit) or may be configured as other circuits than chopper circuits. In addition, the power conversion circuit 3 may be configured by combining chopper circuits (in a manner that a step-down chopper circuit is disposed at the subsequent stage of a step-up chopper circuit, for example).

Further, according to the first to fourth embodiments, the DC power source circuit 2 is configured as an AC/DC conversion circuit using the commercial power supply E1 as the input power supply. However, the DC power source circuit 2 may be configured as a DC/DC conversion circuit using a DC power supply as the input power supply.

In addition, according to the first to fourth embodiments, the light source 7 includes LED elements 71. However, the light source 7 may include other solid light-emitting elements (such as organic EL (electro-luminescence) elements, for example).

Further, the configurations, control methods, and functions of the lighting device 1 according to the first to fourth embodiments may be combined.

(Embodiment 5)

Figure 18:
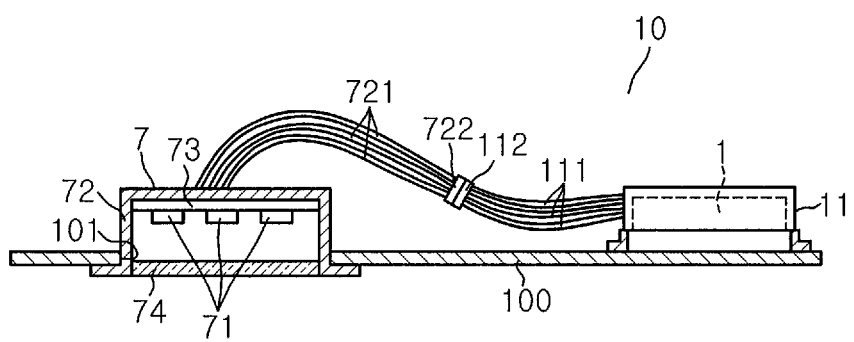
FIG. 18 is a view illustrating a schematic configuration of a luminaire in accordance with a still yet further embodiment of the present invention.

FIG. 18 shows a schematic configuration of a luminaire 10 according to a fifth embodiment of the present invention. The luminaire 10 according to the fifth embodiment is an LED luminaire with a separate power source, which includes the lighting device 1 according to any one of the first to fourth embodiments, and a light source 7 powered by the lighting device 1.

The housing 11 of the lighting device 1 and the housing 72 of the light source 7 are separated. The housing is disposed on the back side of a ceiling 100. The housing 72 has a cylindrical shape with its lower end opened and is inserted into a hole 101 formed in the ceiling 100. The housing 72 has a substrate 73 disposed on its bottom surface (upper surface) therein. The substrate 73 has LED elements 71 mounted on its lower surface (three LED elements are illustrated in FIG. 18). Further, a light diffusion plate 74 is disposed to cover the opening of the housing 72. The light diffusion plate 74 diffuses the light emitted by the LED elements 71.

Conductive lines 111 are extended from the housing 11. A connector 112 is provided at the leading ends of the conductive lines 111. Further, conductive lines 721 are extended from the housing 72. A connector 722 is provided at the leading ends of the conductive lines 721. The connector 112 and the connector 722 are connected to each other, and accordingly the lighting device 1 and the LED elements 71 are electrically connected to each other.

The luminaire 10 of this embodiment includes the lighting device 1 according to any one of the first to fourth embodiments, and therefore, can detect a short-circuit in the switching element Q1 (semiconductor element) included in the power conversion circuit 3. Moreover, when the switching element Q1 has a short-circuit failure, current flowing in the LED elements 71 is reduced, so that it is possible to suppress the LED elements 71 from producing heat and thus can improve safety.

In addition, according to this embodiment, the luminaire 10 is an LED luminaire with a separate power source, which provides the lighting device 1 and the light source 7 separately. However, the luminaire 10 may be configured as an LED luminaire with an integrated power source, which provides the lighting device 1 and the light source 7 integrally.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein.

It is intended by the following claims to claim any and all modifications and variations that fall within the true scope of the present teachings.

What is claimed is:

1. A lighting device for lighting a solid light-emitting element, comprising:
    a DC power source circuit configured to output DC power;
    a power conversion circuit including a semiconductor element connected between output terminals of the DC power source circuit, the power conversion circuit configured to supply power to the solid light-emitting element through a control of a conduction state of the semiconductor element;
    a first control circuit configured to control an output of the DC power source circuit; and
    a second control circuit configured to control an output of the power conversion circuit by controlling the conduction state of the semiconductor element; a short-circuit detection circuit configured to detect a short-circuit in the semiconductor element,
    wherein the first control circuit reduces the output of the DC power source circuit when the short-circuit detection circuit detects the short-circuit in the semiconductor element,
    wherein the semiconductor element is a switching element, switching of the switching element being controlled by the second control circuit,
    wherein the power conversion circuit is a chopper circuit that supplies a desired power to the solid light-emitting element through a control of current flowing in the switching element,
    wherein, the lighting device further comprises;
    a current detection circuit configured to detect a current flowing in the switching element; and
    a timer configured to start to count when the second control circuit outputs an on-signal to turn on the switching element, and configured to reset a counted value when a detection result by the current detection circuit reaches a predetermined value, and
    wherein the short-circuit detection circuit determines that the switching element is in a short-circuit state if the counted value by the timer exceeds a threshold value.

2. A luminaire, comprising:
    the lighting device of claim 1; and
    the solid light-emitting element to be powered by the lighting device.

3. A lighting device for lighting a solid light-emitting element, comprising:
    a DC power source circuit configured to output DC power;
    a power conversion circuit including a semiconductor element connected between output terminals of the DC power source circuit, the power conversion circuit configured to supply power to the solid light-emitting element through a control of a conduction state of the semiconductor element;
    a first control circuit configured to control an output of the DC power source circuit; and
    a second control circuit configured to control an output of the power conversion circuit by controlling the conduction state of the semiconductor element; a short-circuit detection circuit configured to detect a short-circuit in the semiconductor element,
    wherein the first control circuit reduces the output of the DC power source circuit when the short-circuit detection circuit detects the short-circuit in the semiconductor element,
    wherein the semiconductor element is a switching element, switching of the switching element being controlled by the second control circuit,
    wherein the power conversion circuit is a chopper circuit that supplies a desired power to the solid light-emitting element through a control of current flowing in the switching element,
    wherein, the lighting device further comprises;
    a current detection circuit; and
    a timer configured to measure time,
    wherein the chopper circuit includes an inductor, in which the solid light-emitting element, the inductor and the switching element are connected in series to one another between the output terminals of the DC power source circuit;
    wherein the current detection circuit detects current flowing in the inductor;
    wherein the timer starts to count when the control circuit outputs an on-signal to turn on the switching element and resets a counted value when a detection result by the current detection circuit becomes lower than a predetermined value; and wherein the short-circuit detection circuit determines that the switching element is in a short-circuit state if the counted value by the timer exceeds a threshold value.

4. A luminaire, comprising:

the lighting device of claim 3; and the solid light-emitting element to be powered by the lighting device.

5. A lighting device for lighting a solid light-emitting element, comprising:

a DC power source circuit configured to output DC power;

a power conversion circuit including a semiconductor element connected between output terminals of the DC power source circuit, the power conversion circuit configured to supply power to the solid light-emitting element through a control of a conduction state of the semiconductor element;

a first control circuit configured to control an output of the DC power source circuit; and a second control circuit configured to control an output of the power conversion circuit by controlling the conduction state of the semiconductor element; a short-circuit detection circuit configured to detect a short-circuit in the semiconductor element, wherein the first control circuit reduces the output of the DC power source circuit when the short-circuit detection circuit detects the short-circuit in the semiconductor element, wherein the semiconductor element is a switching element, switching of the switching element being controlled by the second control circuit, wherein the power conversion circuit is a chopper circuit that supplies a desired power to the solid light-emitting element through a control of current flowing in the switching element, wherein, the lighting device further comprises;

a voltage detection circuit configured to detect an output voltage of the DC power source circuit, wherein the chopper circuit includes an inductor, in which the solid light-emitting element, the inductor and the switching element are connected in series to one another between the output terminals of the DC power source circuit; and wherein the short-circuit detection circuit determines that the switching element is in a short-circuit state if a detection result by the voltage detection circuit is less than threshold value while the second control circuit outputs an off-signal to turn off the switching element.

6. A luminaire, comprising:

the lighting device of claim 5; and the solid light-emitting element to be powered by the lighting device.

* * * * *